(12) United States Patent
Gasser et al.

(10) Patent No.: US 7,401,137 B1
(45) Date of Patent: Jul. 15, 2008

(54) METHODS AND APPARATUS FOR APPLICATION OF MANAGEMENT ACTIONS TO RESOURCES SHARING RELATIONSHIPS

(75) Inventors: Morrie Gasser, Hopkinton, MA (US); Jeffrey Alexander, Watertown, MA (US); Urayoan Irizarry, Worcester, MA (US); Subhash Vanga, Ashburn, VA (US)

(73) Assignee: EMC Corporation, Hopkinton, MA (US)

( * ) Notice: Subject to any disclaimer, the term of this patent is extended or adjusted under 35 U.S.C. 154(b) by 854 days.

(21) Appl. No.: 10/750,336

(22) Filed: Dec. 31, 2003

(51) Int. Cl.
*G06F 15/173* (2006.01)
(52) U.S. Cl. .......................... 709/223; 709/226; 711/1; 711/100
(58) Field of Classification Search .................. 709/223, 709/226, 229; 707/104.1, 1, 200, 205, 103 Y; 718/104, 106; 711/1, 100, 117
See application file for complete search history.

(56) References Cited

U.S. PATENT DOCUMENTS

| | | | | |
|---|---|---|---|---|
| 7,234,073 | B1* | 6/2007 | Roytman et al. ................ | 714/4 |
| 2002/0120744 | A1* | 8/2002 | Chellis et al. ............... | 709/226 |
| 2003/0093509 | A1* | 5/2003 | Li et al. ....................... | 709/223 |
| 2003/0097556 | A1* | 5/2003 | Gilbert et al. ................... | 713/2 |
| 2004/0031058 | A1* | 2/2004 | Reisman ...................... | 725/112 |
| 2005/0038967 | A1* | 2/2005 | Umbehocker et al. ....... | 711/154 |
| 2005/0120160 | A1* | 6/2005 | Plouffe et al. .................. | 711/1 |

\* cited by examiner

*Primary Examiner*—Frantz B Jean
(74) *Attorney, Agent, or Firm*—Chapin IP Law, LLC; Barry W. Chapin, Esq.

(57) ABSTRACT

In a network management application, a system applies a management action to a resource by receiving a selection of a resource representation in a network environment that represents a resource to which a management action is to be applied. The system applies a series of resource traversal functions to a repository containing objects representative of network resources in the network environment. The traversal functions identify a set of action affected resources in the network environment existing along a set of relationship paths extending to at least one storage device that have a current allocation relationship to the selected resource. The system presents a representation of the set of allocated resources in the network environment to a user of the management application. The representation of action-affected resources informs the user of resources within the storage area network that are currently in an functional relationship with the selected resource to which a management action is to be applied and that may be affected if the management action is to be applied to the selected resource.

33 Claims, 12 Drawing Sheets

GOING DOWN FUNCTION

GOING DOWN EXAMPLE

FIG. 6 — GOING UP FUNCTION

GOING UP EXAMPLE

440
APPLY A CLOSURE FUNCTION TO THE REPOSITORY CONTAINING OBJECTS REPRESENTATIVE OF RESOURCES TO IDENTIFY A SET OF CLOSURE RESOURCES IN THE NETWORK ENVIRONMENT THAT HAVE AN INDIRECT RELATIONSHIP TO ANY RESOURCES IN THE SET OF UPWARD AND DOWNWARD RESOURCES RESOURCES, THE SET OF CLOSURE RESOURCES INDICATING RESOURCES THAT WOULD BE AFFECTED BY A CHANGE MADE TO OPERATION OF RESOURCES

441
IDENTIFY CLOSURE OBJECTS IN THE REPOSITORY BY REPEATEDLY (E.G. RECURSIVELY) RE-APPLYING AN OPERATION OF THE GOING DOWN FUNCTION AND GOING UP FUNCTION TO THE ADDITIONAL OBJECTS REPRESENTING RESOURCES IN THE NETWORK ENVIRONMENT THAT MAY BE AFFECTED BY THE MANAGEMENT ACTION UPON THE SELECTED RESOURCE THAT WERE IDENTIFIED DURING OPERATION OF THE GOING UP FUNCTION

CLOSURE FUNCTION

*FIG. 8*

COLLECTIVE SET OF ACTION-AFFECTED RESOURCES
(I.E., ALL RESOURCES WITH AN ARROWHEAD)
NOTE: SHADED ARE AUTOMATICALLY INCLUDED IN RESOURCE TO WHICH
ACTION WILL BE APPLIED, NON-SHADED ARE CLOSURE RESOURCES THAT
THE USER CAN SELECT TO ADD

METHODS AND APPARATUS FOR APPLICATION OF MANAGEMENT ACTIONS TO RESOURCES SHARING RELATIONSHIPS

Conventional computer systems execute software applications that allow for the creation of vast amounts of data that must be persistently stored for long periods of time. Information systems developers have responded to this need by creating high-capacity data storage systems called storage arrays that include many individual storage devices such as disk drives that collectively operate to store data on behalf of such software applications. Presentation and management of the data stored within the storage devices of storage arrays for access by end-user software applications is a complex process that can involve many processing operations that need to occur in many different components and resources within the data storage and computer systems.

As an example, consider the number of hardware and software components that must collectively operate in functional or operational relationships together in order for a user's software application executing a host computer system to successfully access data stored within one or more of the storage devices within a high-capacity data storage array. To access such data, the user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system then transmits the I/O requests through a host interface device resource, such as an interface card ((e.g., SCSI or FibreChannel adapter) having one or more I/O port resources, across an interface cable or networking medium (e.g., in a storage area network implementation) for receipt by a front-end adapter interface card resource operating within the high-capacity data storage array. The front-end adapter interface card receives the I/O requests and interprets them for access to appropriate data locations within specific storage device resources contained in the storage array. Once the requested data is accessed via the storage devices, I/O responses are returned to the user application along an information or data flow path that includes operations and processing functionality provided by each of the aforementioned components and resources in a reverse direction back to the application. Accordingly then, storage of data in modern computer system environments involves reliance on the proper operation of a multitude of software and hardware resources that share connectivity and operational or functional relationships with one another along processing or data flow paths.

SUMMARY

In a storage area networking environment containing host computer systems and storage arrays, logical resources or objects on a host computer system (host objects or host resources) have relationships with one or more storage device resources on the storage arrays to which the host computer system is connected through the storage area network. Host resources consist of, for example, file systems, databases, logical volumes and volume groups of a logical volume manager, multipath devices, and host interface devices (e.g., network interface cards and interface ports), and each host resource maps to one or more storage device resources (e.g., disk drives) in the storage array. Management actions or commands applied to host resources can affect their operation in multiple ways depending upon how those host resources are mapped via relationships to their corresponding storage device resources.

As an example, application of management operations or actions (e.g., commands) on a host resource, such as deallocation of storage space associated with that host resources (e.g., removing storage space assigned to a file system or database or volume group), disabling paths, establishing zoning, changing protection levels and so forth may affect operation of those and possibly other host or even non-host resources in sometimes unpredictable manners. An administrator performs or applies such management actions in a conventional management application typically by selecting a graphical set of objects that represent the resources and by selecting the management action to apply to those selected objects or resources.

Embodiments of the invention are based in part on the observation that it is often necessary for a user such as a storage systems administrator to know, for example, what host resources would be affected by some action that is to be applied to a selected set of storage resources such as storage devices (e.g. disk drives) within a storage array. In some cases, a host resource such as a volume or file system is fully represented by a selected set of storage devices. In this first case, that host resource does not use any storage device resources other than the ones to which the action is to be applied. In this case the actions on the storage device resources are in effect actions on the host resource and the user needs to be informed of this. In other cases, a host resource may only be partially represented by the set of storage device resources to which an action is to be applied. In this case an action on the storage devices would affect a possibly unpredictable portion of the host resource, causing an incomplete action on the host resource and possibly corrupting that host resource. In the later case, the administrator may want to insure that the action on the affected host resource is complete (i.e., like the first case). To do this embodiments of the invention allow the user to find all the other storage device resource that the host resource "uses" (i.e., that share an operational or functional relationship with the host resource, either directly or indirectly via other resources), that are not part of the originally selected set of resources, and to carry out the action on those other storage device resources as well. However those storage device resources in turn may be "used by" yet more host resources and embodiments of the invention provide a way to discover the identity of those other resources. Once discovered, the system of the invention can present this information to the user/administrator to allow this person to have knowledge of what resources may be impacted or affected is the management action is applied to the selected resources.

As a specific example, in multi-user and multi-application computer system environments such as commercial computer system installations that provide storage within a storage area network, information systems developers have created software programs called volume managers that operate in conjunction with operating systems on host computer systems. A volume manager is a software application that is able to aggregate the collective storage capacity of many storage devices within a high-capacity data storage array to present this storage capacity as a single accessible entity called a volume that applications are able to use to store data. From the perspective of a software application accessing data within a volume, details of which storage devices contain or store which portions of accessible data within a volume or what other underlying resources are used to create and present volumes are irrelevant. The software applications simply access data within the volume and the volume manager handles the processing task of directing application requests for data to the specific storage devices containing the requested data portions.

Computer systems administrators are able to control a volume manager to allocate and deallocate storage device capacity to particular volume groups as the demands of storage change for a volume group. As an example, if a database or file system operates on a host computer system to store data within a particular volume group, as the capacity of the database or file system increases, a computer systems administrator can use a volume manager to allocate additional storage device capacity by adding a volume to the volume group in order to allow the database or file system to grow in size. Likewise, if a particular volume group has a large number of allocated volumes but the amount of data to be stored within the volume group is relatively small, the systems administrator is capable of deallocating a volume from that volume group to allow those deallocated storage devices associated with the deallocate volume to be used to store other data.

Conventional techniques for applying an action such as managing allocation and deallocation of storage device capacity or associated resources within a computing system environment suffer from a number of deficiencies. As an example, using a conventional volume manager software application, if a computer or storage system administrator desires to apply an action such as deallocation of storage space such as one or more storage devices from a particular volume, database or file system, the administrator operates a conventional storage management application such as the volume manager to graphically select an icon representing the storage device(s) to be deallocated. The administrator then invokes a deallocation command in order to have the conventional volume manager application remove the storage space within the specific selected storage devices from the associated volume, thus freeing-up that storage capacity for other uses. Once deallocated, the volume manager considers those storage devices available for use by other entities (e.g., other databases, file systems or volumes) that may require additional storage capacity. Once deallocated, the volume manager may reallocate those storage devices to other volumes.

This conventional deallocation approach can be problematic since situations may arise in which multiple host objects within the computing system environment reference a particular set of allocated storage devices. As a hypothetical example, there may be other software applications that are responsible for accessing storage devices allocated to a particular volume in order to make backup or replica copies of the data within a volume at periodic intervals (e.g., nightly backups) or in real-time (e.g., data mirroring). A backup administrator responsible for administering the replication of storage devices may be a different person than the system administrator responsible for management of volume capacity. Accordingly, it may be unbeknownst to the systems administrator at the time of applying an action such as deallocating a storage device from a volume that a backup or replication application also references the storage device within the volume. Accordingly, if a storage device is deallocated from the volume yet the replica application continues to try to replicate information within the storage device, inaccuracies can arise if the replicated data is ever required for future reference.

As another example, suppose a systems administrator desires to remove a host interface card from a host computer system due to suspected faulty operation. To do so, the systems administrator may operate a conventional network management program to apply a management action such as shutting-down and deallocating the interface card from operation with the operating system and any hardware or software resources that may attempt access to data storage systems through the interface card. The administrator may think it he or she knows which software particular applications executing a host computer systems are currently referencing storage space on the data stored system through that host via the interface card. Accordingly, prior to deallocating the interface card, the systems administrator will first attempt to reconfigure those applications to reference alternative storage devices through another interface card. However, conventional mechanisms to discover the other host resources that rely on the use of the interface card is largely a human or manual operation that relies heavily on intuition of the administrator to be able to identify which host resources (e.g., which software applications, file systems, databases, volume groups and the like) are currently referencing the host interface device. If the systems administrator deallocates the interface card and thus halting its operation, and that person accidentally failed to recognize the particular host resource such as a software application still required access, for example, to data stored within a storage device formerly accessible to the host computer system via the now deallocated interface card, that software application will likely experience execution problems due to the inability to access the data using the interface card that is now deallocated.

Generally then, conventional systems for managing actions applied to resources within computing system environments such as storage area networks lack ability to perform a resource relationship identification process that identifies resources that may be dependent on other resources prior to allowing a user to perform a requested management action. That is, conventional network, storage, computer system or other resource management software applications do not provide a capability to identify all computing system or storage resources that may be dependent upon a particular resource or entity to which an action is to be applied prior to allowing the user to perform the action. Accordingly, such conventional systems rely on the ability of the administrator to recognize when one resource in a computing system environment is dependent on another. Due in part to this reliance, situations frequently arise in which one resource such as a software application fails to operate properly due to the fault of the administrator operating the management application to apply some action to a particular resource upon which that application was dependent.

Embodiments of the invention significantly overcome such deficiencies and provide unique mechanisms and techniques for identifying and presenting to a user, such as a systems administrator, any action-affected resources having dependencies or relationships to resources upon which a management action is to be applied in a computing system environment such as a storage area network. The action-affected resources discovered according to embodiments of the invention can allow the systems administrator to make more informed decisions about application of a specific action to a specific set of selected resources prior to application of the management command.

As an example, in a storage area networking environment, if a storage network administrator desires to deallocate a storage device from a particular resource such as a volume, database or file system, embodiments of the invention can perform a resource discovery operation using a series of resource traversal functions in order to identify other resources within the storage area network that are dependent upon or that use the storage space presently allocated to the volume. The resource traversal functions can include a going down function, a going up function and a closure function that taverse a hierarchy of resources to discover what resources may be affected by application of a management command to a selected resource. As another example, if the storage area network administrator desires to deallocate the storage space associated with the particular logical volume, embodiments of the invention can operate to discover all resources or entities within the storage area network environment that rely upon or that use or otherwise reference that logical volume. This can include, for example, file systems and/or databases that reference the logical volume. Embodiments of the invention thus provide mechanisms and techniques for computing the set of resources affected by an action that is to be applied to a particular managed resource, such as a storage device.

Embodiments of the invention include computerized devices, such computer systems, workstations, hosts, management stations or other devices configured or operable to process and perform all of the operations disclosed herein as embodiments of the invention. In such embodiments, a computer system includes a memory system, a processor, a communications interface and optionally a display and an interconnection mechanism connecting these components. The memory system is encoded with a management application that includes a resource manager application (i.e., executable code) that when performed on the processor, produces a management process that includes a resource manager process that operates as explained herein.

Other arrangements of embodiments of the invention that are disclosed herein include software programs such as management applications containing a resource manager that performs the method embodiment steps and operations summarized herein for a resource manager. More particularly, a computer program product is disclosed that has a computer-readable medium including computer program logic encoded thereon that when performed in a computerized device provides operations of the resource manager application and process as respectively explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software (source code and/or object code) or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or processes or may execute on a dedicated computer in a network environment. The resource manager may be integrated into a storage area network management application or may exist as a service available to many different network management applications.

It is to be understood that the system of the invention can be embodied strictly as a software program, as software and hardware, or as hardware alone and that embodiments also include the process or method steps explained herein, regardless of implementation. Example embodiments of the invention may be implemented within EMC's Control Center software application(s) that provide management functionality for storage area network resources and in computerized devices that operate the Control Center software. Control-Center is a trademark of products manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 8 is a flowchart of processing steps that show processing details of application of a closure resource traversal function in accordance with one embodiment of the invention.

DETAILED DESCRIPTION

Figure 1:
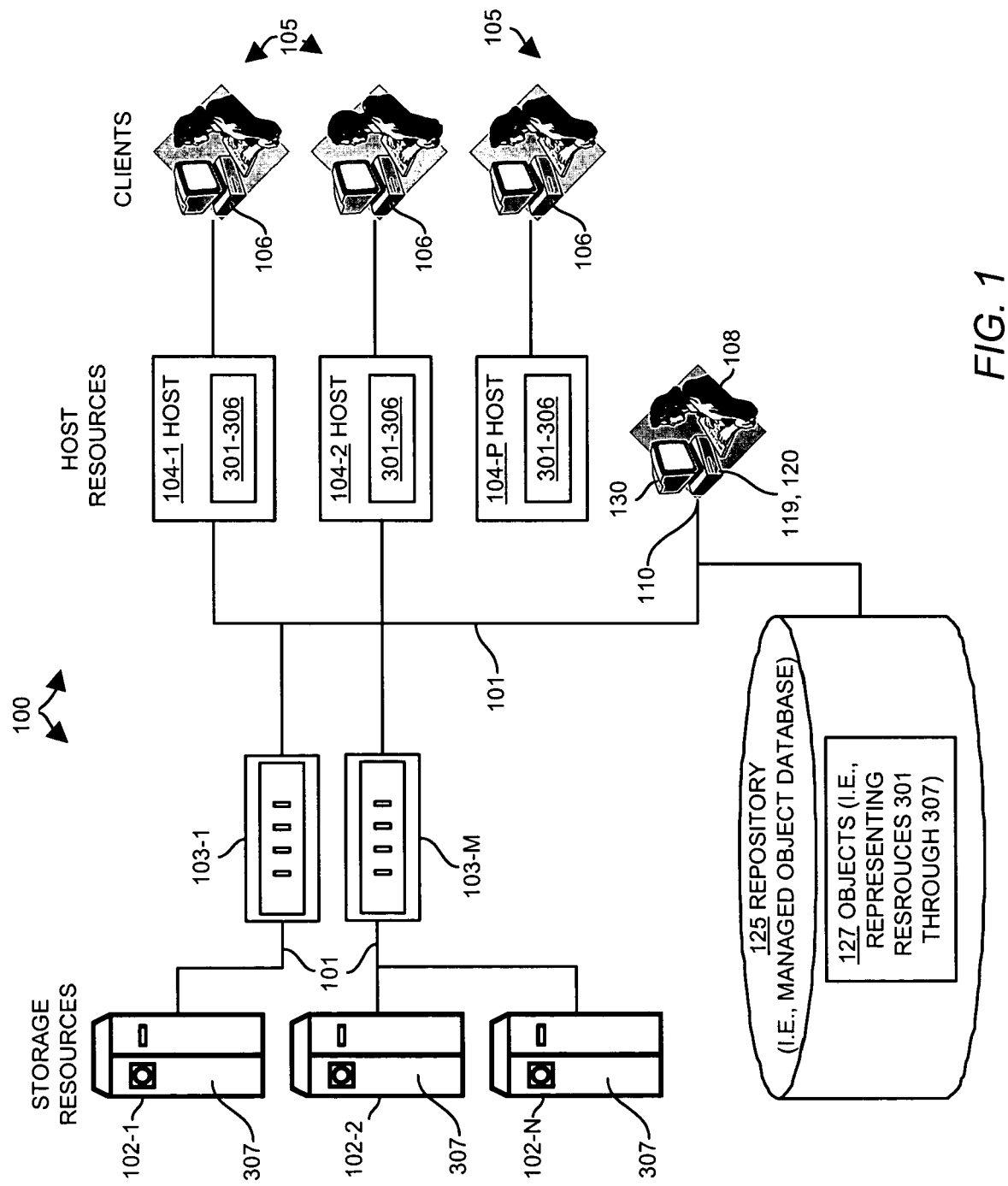
FIG. 1 illustrates an example of a storage area network environment including a management application having any resource manager configured in accordance with embodiments of the invention.

FIG. 1 illustrates an example of a network environment 100 suitable for use in explaining the operation of example embodiments of the invention. The network environment 100 in this example is a storage area network that includes a network medium 101 such as high-speed data communications cabling (e.g., Ethernet, optical network, or other type of network) that interconnects and allows a plurality of components 102 through 110 to communicate with each other. The components or devices in this example include a variety of data storage systems 102-1 through 102-N, storage area network switches 103-1 through 103-M, host computer systems 104-1 through 104-P, client computerized devices 105-1 through 105-S, and a computerized device 110. The computerized device 110 is configured, in this example, as a storage area network management workstation that is operated by a network administrator or user 108 (i.e., a person responsible for managing the resources within the storage area network 100).

According to the general operation of the storage area network 100, the client computer systems 105 operate software applications 106 that communicate with host resources 301 through 306 such as database programs 301, file systems 302, logical volume groups 303, logical volumes 304 and the like within the host computer systems 104. The host resources 301 through 306 are configured in operational relationships with each other and with storage resources 307 within the data storage systems 102 to allow data access to occur to data stored within the data storage resources 307 (e.g., disk drives) operating in the data storage systems 102. Due to the complexity of the storage area network environment 100, the network management station computerized device 110 operates a network management application 119 that allows the administrator 108 to control, configure and generally manage the devices 102 through 104 and resources 301 through 307 within the storage area network 100 to efficiently provide access to data on behalf of the clients 105.

To assist in this process, the network management application 119 includes a resource manager 120 that performs processing to apply management actions (i.e., management commands) selected by the user 108 to resources within the network 100 in accordance with embodiments of the invention as explained herein. It is to be understood that the resource manager 120 in accordance with embodiments of the invention may be included within any type of network management software application that can execute, perform or otherwise operate within a management station computerized device 110 and is not limited to application within a storage area network.

The resource manager 120 generally operates as explained herein to receive a management action or command from the user 108 (e.g., via a graphical user interface action on the display 130), which is to be applied to a user selection of resource representations, presented by the management application 119 as graphical icons on the display 130 of the management station computer systems 110. Once a management action and selection of resources are received from the user 108, the resource manager 120 can identify operational relationships between the selected resource and other resources 301 through 307 within the storage area network 100 that may be affected by the application of the management action to the selected resource. Once the resource manager 120 identifies the other resources 301 through 307 that may be affected by the management action, the resource manager 120 can present this information to the user 108 (e.g., via a table, list or graphical layout on the display 130) to inform the user of all resources (that he or she may not have been aware of) that may be affected by the particular management action selected if applied by the user 108 via the management application 119. The user is then able to modify his or her selection criteria to include more or less of the collective set of action-affected resources that will be affected by the management action in order to ensure that the operation of the resources 301 through 307 is not adversely affected by the management command or action.

As a brief example of the invention in operation, suppose the user 108, using the management application 119 operating the resource manager 120, graphically selects a representation of a file system resource 302 within one of the host computer systems 104. Further suppose that the user 108 decides to apply a management action such as deallocation to the selected file system resource 302 in order to deallocate storage space from the file system 302. The resource manager 120 of the invention is able to identify other resources 301 through 307 that are operationally related to the file system resource 302 to which the management action is to be applied. These other resources may be, for example, the logical volume resource 304, the host device resource 306, one or more storage device resources 307 (operating within the storage systems 102) and so forth. Once identified, the resource manager 120 can graphically present this collective set of action-affected resources to the user 108 to inform the user of the total set of resources 301 through 307 within the storage area network environment 100 that will be affected by the deallocation action if it is to be applied to the selected file system 302. Based on this information, the user 108 is able to make an informed decision if the deallocation action will be properly carried out as intended so as to not adversely affect operation of those other resources that will be impacted by the deallocation action.

Prior to discussing further operational details of embodiments of the invention, a brief discussion will be presented explaining interrelationships between resources 301 through 307 in a typical storage area network configuration. It is to be understood that the following explanation of resource relationships is not intended to be limiting to embodiments of the invention but rather, embodiments of the invention are applicable to other types of interrelationships between the same or between different types of resources within a networking environment.

Figure 2:
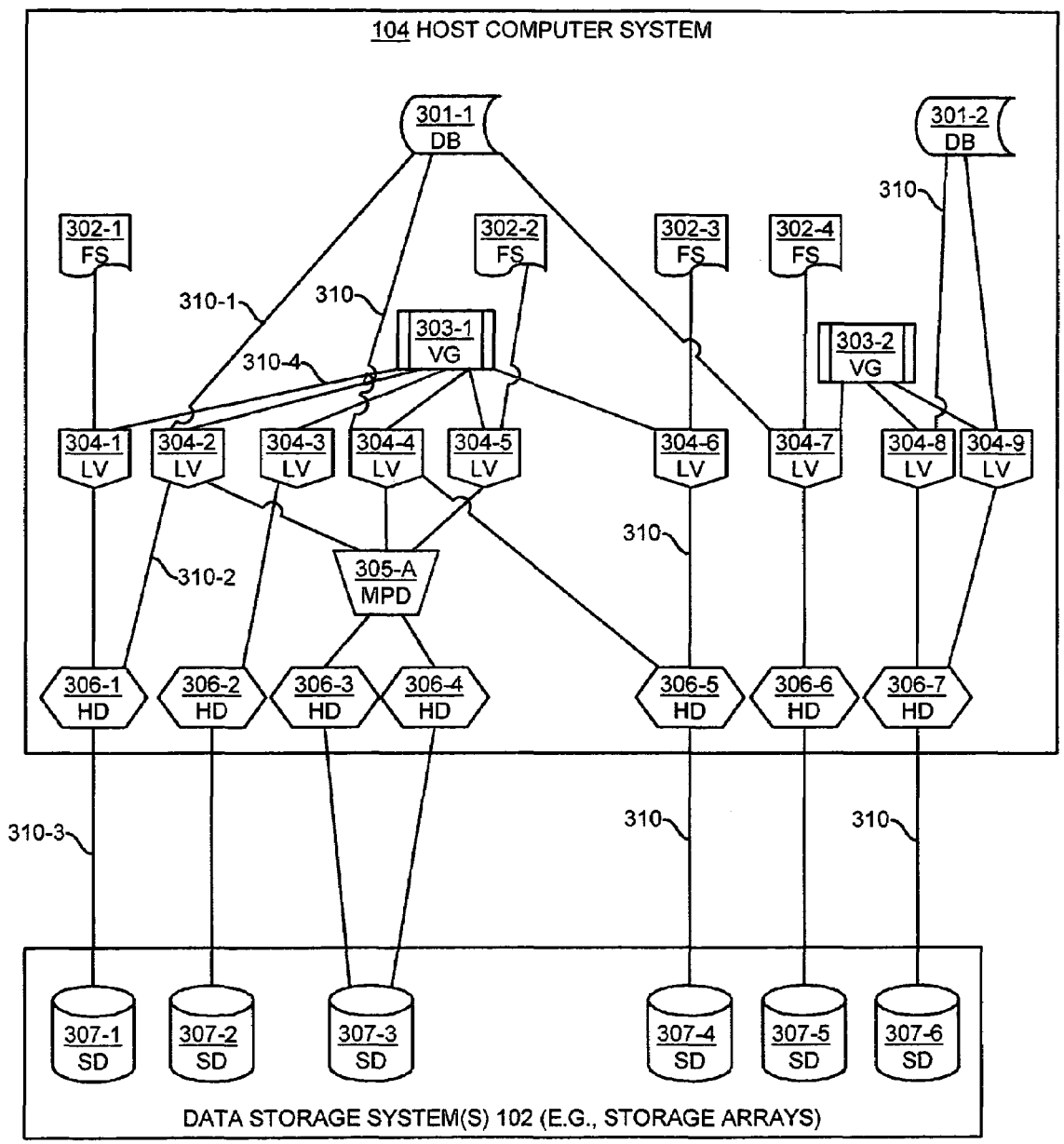
FIG. 2 is a resource relationship diagram illustrating an example of resources arranged in hierarchical relationships with one another between host computer system and data storage system.

FIG. 2 shows details of resource inter-relationships for a set of example host resources 301 through 306 within a host computer system 104 and for storage resources 307 within an example data storage system 102. As shown in this example, the resources 301 through 307 include database resources 301, file system resources 302, volume group resources 303, logical volume resources 304, multipath device resources 305, host interface device resources 306 and storage device resources 307. The relationship paths, lines or indicators 310 extending between the various resources 301 through 307 indicate specific operational, functional or "in use" relationships between the various resources. Such relationships 310 indicate, for example, that one resource is "used by" or is in use by or depends upon the operation of another resource.

As an example, the relationship indicator 310-1 extending between the database resource 301-1 and logical volume resource 304-2 indicates that the logical volume resource 304-2 configured within the host computer system 104 is "in use by" the database resource 301-1. Likewise, the relationship indicator 310-2 indicates that the host interface device resource 306-1 he is in use by the logical volume resource 304-2. Continuing this example, the relationship indicator 310-3 that extends out of the host computer system 104 across the storage area network 100 (e.g., through one of the switches 103 in FIG. 1) and adjoins storage device resource 307-1 (which may be, for example, a disk drive within the data storage system 102) and indicates that the storage device resource 307-1 is in use by the host device resource 306-1.

The resource indicators 310 in FIG. 2 further illustrate data flow, relationship paths or information flows between resources within the storage area network 100. As an example, the continuous path of resource indicators 310-1 through 310-3 represent data flow or information flow or in use paths from the database resource 301-1 to the storage device resource 307-1. This data flow path 310-1 through 310-3 indicates that a portion of the data associated with the database resource 301 (e.g., a database instance available for access to climb computer systems 105 within the host computer system 104) is stored within the storage device resource 307-1 (i.e., is stored within a disk drive represented by this storage device resource). Note that only a portion of the data from the database resource 301-1 is stored within the storage device resource 307-1 because other relationship paths extend from the database resource 301-1 to other logical volume resources 304 which, in turn, have other relationship indicators 310 extending to other resources that continue on down to different data storage device resources 307.

Embodiments of the invention are based in part on the observation that a management action applied to a particular resource 301 through 307 within a network environment such as the storage area network 100 can have an impact or affect on other resources due to the operational relationships existing between the various resources. Using the deallocation example from above, the user 108 selects a graphical representation of the file system resource 302-1 and decides to deallocate some or all of the storage space associated with this file system resource 302-1. Embodiments of the invention are able to follow the relationship indicators from the selected file system resource 302-1 down to the logical volume resource 304-1 and further down to the host interface device resource 306-1 and then to the lowest level storage device resource 307-1. Based on this information, deallocation of storage space in the file system 302-1 has an impact on the resources 304-1, 306-1 and 307-1 within the network environment 100 since each relates to operation of the other.

Likewise, notice that the volume group resource 303-1 has a relationship indicator 310-4 extending to the logical volume resource 304-1. This indicates that the logical volume resource 304-1 is also "in use" by the volume group resource 303-1. Accordingly, the deallocation operation applied to storage space associated with the file system resource 302-1 can potentially have an impact on the proper operation of the volume group resource 303-1 since this volume group 303-1 "uses" (i.e., includes data stored on storage space associated with) the logical volume 304-1 which is also, as explained above, "used by" the file system resource 302-1 from which space is to be deallocated. Accordingly, due to the complex series of interrelationships between the resources illustrated in FIG. 2, application of a management action to any particular resource 301 through 307 as selected by the user 108 by using a management application 119 may have potential adverse operational impact on other resources.

Embodiments of the invention operate to allow the user 108 to identify those other resources 301 through 307 that might be impacted by application of a particular management action or command to a particular selected resource 301 through 307 or group of selected resources. To perform such operation, embodiments of the invention are capable of traversing relationships between resources as indicated in FIG. 2 by the resource indicators 310 to discover or identify operational, functional, dependency, inheritance or other types of interrelationships between resources within, for example, the host computer system 104 and the data storage system 102 in order to notify the user of those other impacted resources that may be affected upon application of a management action to the selected resource(s) 301 through 307 chosen by the user for that action.

To traverse the resource indicators 310, embodiments of the invention apply a series of resource traversal functions that can navigate up and down in a resource hierarchy along the relationship indicator paths 310 within the repository 125 that contains objects 127 that represent the collective set of resources operating within the storage area network 100. In particular, objects 127 representative of resources 301 through 307 in the network environment in the repository 125 are hierarchically arranged in an order according to the relationships indicators 310. The hierarchy order includes host objects representing host resources 301 through 306 and storage objects representing storage resources 307 that are allocated for storing data accessed by the host resources. The host objects (i.e. resources 301 through 306 in a host computer system 104) are hierarchically related above the storage objects 307 (the lowest objects) in the hierarchically arranged order.

In one embodiment of the invention, the hierarchy or order of resources includes top-level resources that include database 301, file system 302 and volume group resources 303 (top level objects in the repository or resources in the actual storage area network 100), followed by the next lower level of logical volume resources 304, which are then followed downward in the hierarchy by multipath device resources 305, below which are host interface device resources 306 which are then followed downward by the lowest level storage device resources 307. Hierarchically arranged host objects thus include a top-level host computer system (i.e., the computer itself and all its resources), a database 301, a file system 302, a volume group 303, a logical volume 304, a multipath device 305, a host interface device such as a host interface card or port. Hierarchically arranged storage objects include the lowest-level storage devices 307 such as disk drives that store data. Other resources not shown in these examples can include, for example, a storage adapter, storage ports, software entities in the data storage system 102 and so forth. As will be explained, the hierarchy of relationships between the resources 301 through 307 can be followed up or down by the resource traversal functions in order to identify device path data (shown as relationship indicators 310 in FIG. 2) that extend along the set of device or relationship paths 310 that indicates resources involved in those relationships.

It is assumed for proper operation of embodiments of the invention that the repository 125 contains a collective set of objects 127 that properly represent the operational relationships as they currently exist between actual resources 301 through 307 within the storage area network environment 100. That is, the repository 125 contains a collective set of objects 127 that contain data and information about each resource within the storage area network 100 and the objects 127 contain references such as pointers, inheritances, function calls, application programming interfaces (APIs) or other software mechanisms for one object to reference another thus defining or indicating an operational relationship 310 between the resources that correspond to those objects 127 in the repository 125. Accordingly, the resources 301 through 307 illustrated in FIG. 2 can equivalently be thought of as respective objects 127 that reference one another according to the relationship indicators 310. In other words, the illustration in FIG. 2 is also suitable for use as a view of the objects 127 that respectively correspond to each individual resource 301-307 in the repository 125.

An example of a repository 125 to which embodiments of the invention may be applied is the Enterprise Control Center (ECC) store repository maintained by EMC Corporation's ECC storage area network management software that includes a resource manager 120 in accordance with one example embodiment of the invention. ECC is a management application 119 for storage area network management and allows application of management actions such as deallocation of data storage space allocated on behalf of resources 301 through 307 that operate to store of data under management of the management application 119.

Further details of operation of the resource manager 120 will now be provided with respect to a series a flowcharts and resource diagrams (like FIG. 2) for various processing operations that the resource manager 120 performs in accordance with embodiments of the invention.

Figure 3:
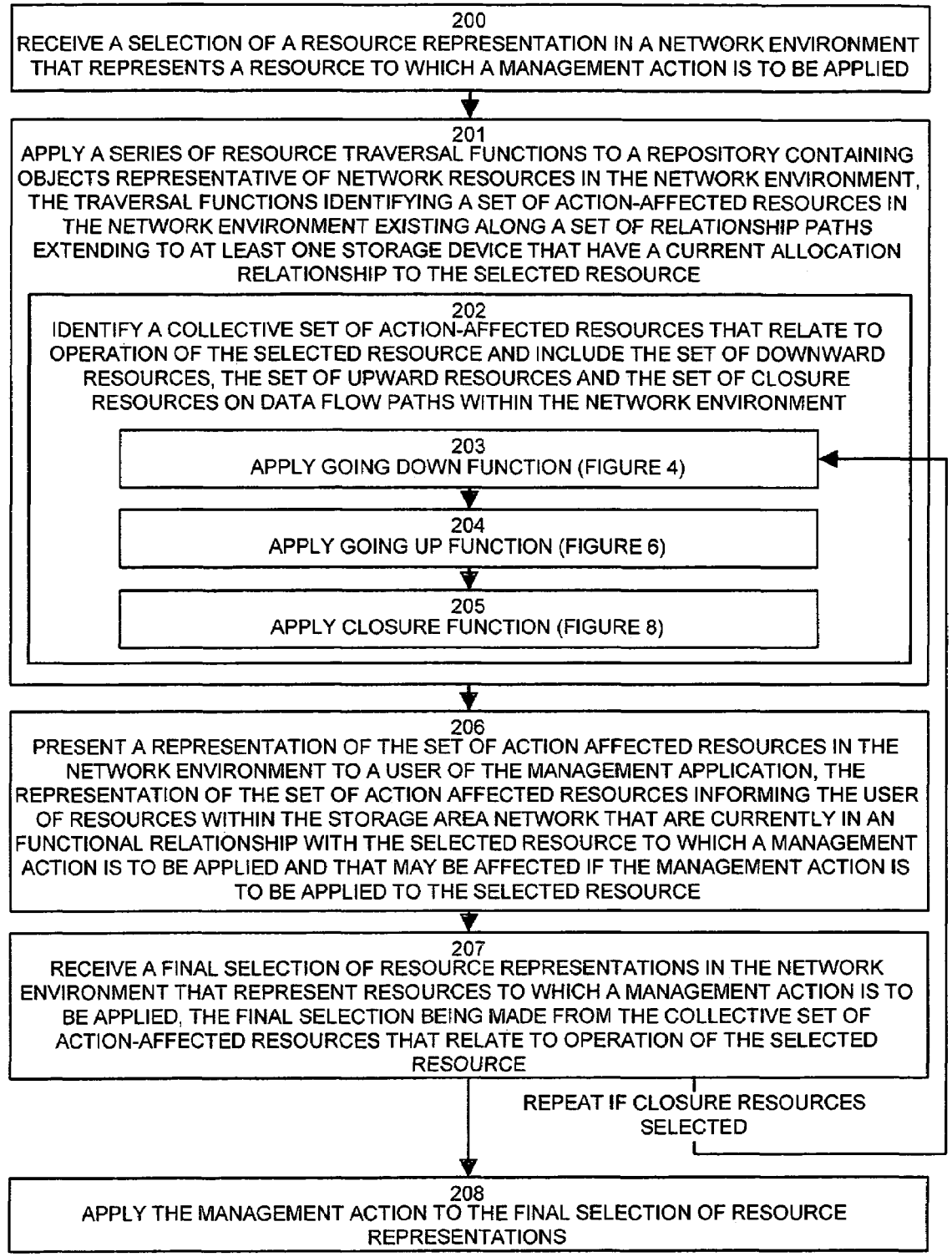
FIG. 3 is a flowchart of processing steps for application of a management action to a resource in accordance with one embodiment of the invention.

FIG. 3 is a flowchart of processing steps performed by the resource manager 120 operating within a network management application 119 in order to allow the user 108 to apply a management action such as deallocation of data storage space assigned to a resource, such as one or more of the example resources 301 through 307 explained above.

In step 200, the resource manager 120 receives a selection of a resource representation in a network environment that represents a resource 301 through 307 to which the management action is to be applied. The management action can also be received in this step. The resource manager 120 operating within the management application 119 can receive the selection of the resource representation by first presenting, for example, a list of currently operating resources 301 through 307 in a graphical format on display 130 of the management workstation 110. Such a graphical display can present, for example, a graphical view such as that shown in FIG. 2 that illustrates various interrelationships and hierarchical levels of resources 301 through 307 within a host computer system 104 and data storage system 102 in a storage area network environment 100. It is to be understood that any type of graphical representation of various entities resources within a storage area network is suitable for use by embodiments of the invention for displaying selectable resources to which a user can select for application of one or more management actions. Examples include a table, list, tree, network topology display and the like.

In step 201, the resource manager 120 applies a series of resource traversal functions to the repository 125 containing objects 127 representative of network resources 301 through 307 in the network environment 100. The resource traversal functions (each to be explained until shortly) identify action-affected resources (i.e., as fond during traversal of relationships indicated by relationship indicators 310 in the example in FIG. 2) for a set of allocated resources in the network environment 100 existing along a set of relationship paths (e.g., 310) extending to at least one storage device 107 that have a current allocation relationship to the selected resource. Complete details of application of the resource traversal functions will be explained shortly. For purposes of this high-level discussion of the flowchart in FIG. 3, sub-steps 202 through 205 provide processing associated with application of the resource traversal functions.

In step 202, the resource manager 120 identifies a collective set of action-affected resources that relate to operation of the selected resource. The collective set of action-affected resources includes, as will be explained, a set of downward resources, a set of upward resources and a set of closure resources on data flow paths (i.e., operational relationships 310) within the network environment 100. To identify the collective set of action-affected resources, sub-steps 203 through 205 perform respective resource traversal functions in accordance with embodiments of the invention to identify all affected resources within the storage area network environment 100 that may be affected by application of the management action to the user selected resource(s).

In step 203, the resource manager first applies a "going down" function to the repository 125 containing objects 127 representative of resources 301 through 307 to identify a set of downward resources in the network environment 100 that have a downward allocation relationship to the selected resource. Generally, a downward allocation relationship indicates resources that the selected resource depends upon and that are in operational use during access to data by the selected resource on a downward allocation path beginning at the selected resource and extending downward through the network environment and terminating at physical storage device resources 307 that store the data accessed by the selected resource. As an example, if the user 108 selects a file system resource 302, application of the going down function traverses any resource indicators 310 from the selected file system 302 to identify any lower-level resources in the resource (i.e., object) hierarchy below the selected file system 302 (i.e., within the repository of objects 127). Such resources can include, for example, one or more logical volume resources, multipath device resources 305, host interface device resources 306, and storage devices 307 example illustrated in FIG. 2. Each resource encountered during the going down function becomes part of the collective set of action-affected resources that may be potentially affected if the management action is applied to the selected resource. The going down function follows all downward branching resource indicator 310 from each resource encountered to arrive as a set of lowest level storage device resources 307.

Next, in step 204, the resource manager 120 applies a going up function to the repository 125 containing objects 127 representative of resources to identify a set of upward resources 307, 306, 305 . . . 301 in the network environment 100 that have an upward allocation relationship to the selected resource. However, for the going up function, the upward allocation relationship indicates resources that depend upon operational use of resources discovered in the set of downward resources, but that exist on an upward allocation path that begins at the physical storage devices resources 307 that store the data accessed by the selected resource as identified in the set of downward resources and that extend upward through the network to top-level resources comprising at least one host device resource (e.g., such as databases, file systems or volume groups) other than host device resources identified in the set of downward resources.

In other words, in step 204, the going up function begins at the lowest level storage device resources 307 identified by the going down function in step 203. From those lowest level storage device resources 307, the going up function traverses upward along each relationship indicator 310 that can be followed toward any upward level resource in hierarchy. This processing can include branching out to all resources not originally discovered along the relationship paths or information flows identified during the going down function. One purpose of the going up function is to discover resources they do not operate directly within the path from the selected resource to a lowest level storage device resource but nonetheless operate and rely upon or use some of those resources along the path discovered by the going down function.

As an example, if the selected resource is a file system 302, the going down function as explained above will traverse through the resource (i.e., objects) hierarchy in the repository 125 to arrive at one or more lowest level storage device resources 307. Along this downward relationship path, suppose a logical volume resource 304 is discovered. Thereafter, during application of the going up function, as the going up function traverses through host interface devices 306 and continues to the logical volume resource 304 originally discovered during the going down function application, it may be the case that this logical volume 304 is part of, for example, a volume group 303 that was not originally discovered during application of the going down function from the originally selected file system 302. Accordingly, the going up function discovers the volume group resource 303 in adds this resource to the collective set of action-affected resources. This is because the volume group 303 discovered during application of the going up function "uses" the logical volume 304 that exists within the direct path from the selected file system to a lowest level storage device 307.

As such, if the management action to be applied is, for example, an action to deallocate storage space from the selected file system 302, this action could have an operational impact on the logical volume 304 that is also part of the volume group 303. Accordingly, the going up function includes the volume group resource 303 in the set of action-affected resources since the deallocation of storage space from a logical volume 304 may impact applications that access the volume group 303 that references (i.e., it uses or includes) this logical volume 304. The going up function continues to operate until all top-level objects are discovered. Such objects (corresponding to resources) may include top-level objects such as a database resources 301, file system resources 302, and volume group resources 303 that were not originally selected during the selection process or discovered during application of the going down function.

In step 205, the resource manager 120 applies another resource traversal function known as a "closure" function to the repository 125 containing objects 127 representative of resources 301 through 307 to identify a set of closure resources in the network environment that have an upward or downward allocation relationship to any resources discovered during the initial application of the going up and going down functions. The set of closure resources indicates resources that may be affected by a change made to application of the action on resources found during the first pass of the going up and going down functions as well. In step 205, the closure function causes the resource manager 120 to essentially perform the going up and going down functions all over again for any resource that was discovered as a result of application of the going up function other than volume group resources.

Closure can be defined formally using graphing terminology as the "largest connected sub-graph that contains any of the going up/down resources other than volume groups 303". Operation of the closure function thus involves performing the going down again function from all objects other than volume groups 303, and then performing the going up function again, and then down again, and up again and so on repeatedly, until no new objects other than volume groups 303 are found. Volume groups can be left out of the closure process because they are groups of resources rather than resources themselves, where removing a member of the volume group does not affect other members of the group. Using graph theory terminology, if the interrelated objects 127 corresponding to the resources 301 through 307 are the vertices and the "used by" and "uses" relationship indicator lines 310 are the edges of the graph, then the relationships of all possible objects to each other can be pictured as a directed graph. In other words, the illustration in FIG. 2 can be that of a directed graph of the objects 127 in the repository 125 that represent the resources 301 through 307 as they are labeled. The closure function thus determines the largest connected sub-graph that contains any of the going up/down resources other than volume groups 303. The set of closure resources is further added to the collective set of action-affected resources. Upon completion of application of the closure function, an exhaustive list all resources that may be affected by the management action provided by the user 108 have been identified and processing proceeds to step 206.

In step 206, the resource manager 120 presents a representation (e.g., via the graphical user interface of the display 130) of action-affected resources (i.e., discovered resources) for the set of allocated resources in the network environment to a user 108 of the management application 119. The representation of the action-affected resources informs the user of resources 310 through 307 within the storage area network that are currently in a functional relationship with the selected resource to which a management action is to be applied and that may be affected if the management action is to be applied to the selected resource. In other words, in step 206 the management application 120 present to the user 108 to collective set of action-affected resources discovered as a result of application of the going down function, the going up function and the closure function.

Even though the management action was initially selected by the user 108 to be applied only to the user selected resource (s) (e.g., logical volume 304-4), in effect, since the other resources discovered by the resource transversal functions are impacted by this management action as well, the resource manager 120 automatically considers the object discovered by going down and going up as additional resources to which this management actions also applied. In this embodiment then, the resources discovered during the initial application of going down and going up functions are thus automatically added to the set of selected resources. The set of closure resources are displayed to the user, but are not however automatically added to the selected group of resources to which the management action is applied.

In step 207, the resource manager 120 receives a final selection of resource representations (e.g., via the graphical user interface of the display 130) in the network environment 100 that represent resources to which the management action is to be applied. The final selection is made from the collective set of action-affected resources that relate to operation of the selected resource(s) as displayed to the user in step 206. In step 207 then, the user is able to select or unselect particular individual resources from all resources identified during application of the resource traversal functions in order to allow application of the management action such as deallocation of storage in a more granular or finite manner thus having additional control over which resources may be affected during application of the action to the selected resource.

As noted above, after application of the resource traversal functions, the selected set of resources to which the management action is applied now includes the original user selected resource(s), as well as any resources discovered by the initial application of the going up and going up functions. In one embodiment, closure resources are only shown or display (e.g., in a table, list, tree or other graphical construct on the display 130) to the user as being affected or impacted by the management action, but are not automatically added to the selected set of resources to which the management action will be applied. In step 207, if the user includes (i.e., adds to the selected set of resources) any resources in the set of closure resources identified during application of the closure function in step 205, the management application activates the resource manager 120 to reapply the series of resource traversal function in step 203 through 205 to those closure. In an alternative embodiment, all resources discovered during the going up, going down and closure functions are added to the selected set of resources.

One purpose for the re-application of the going down function, the going up function and the closure function to any user selected closure resources chosen in step 207 is that these closure resources may not have been fully discovered in terms of what resources are used according to the resource traversal functions for those closure resources. As an example, suppose application of the first iteration of the closure function in step 205 identified a network resource that was not previously discovered during application of the going down or going up functions in step 203 in 204. As such, there could potentially be other resources within the network environment 100 that are dependent upon or that are used by this newly discovered closure resource. Accordingly, in step 207, if the user adds or selects a closure resource for application of the management action, processing returns to step 203 to re-apply the resource traversal functions using the selected closure resource as a starting point.

In step 208, after the user has selected all resources for application of the management action, the resource manager 120 applies the management action to the final selection of resource representations. In this manner, embodiments of the invention enable a user of the network management application to discover resources within the network environment that may be affected by application of the management action. Embodiments of the invention thus prevent situations in which a user applies the management action to the resource in the network without fully knowing the ramifications that may occur to other resources that may depend upon the selected resource to which the management action is applied.

Figure 4:
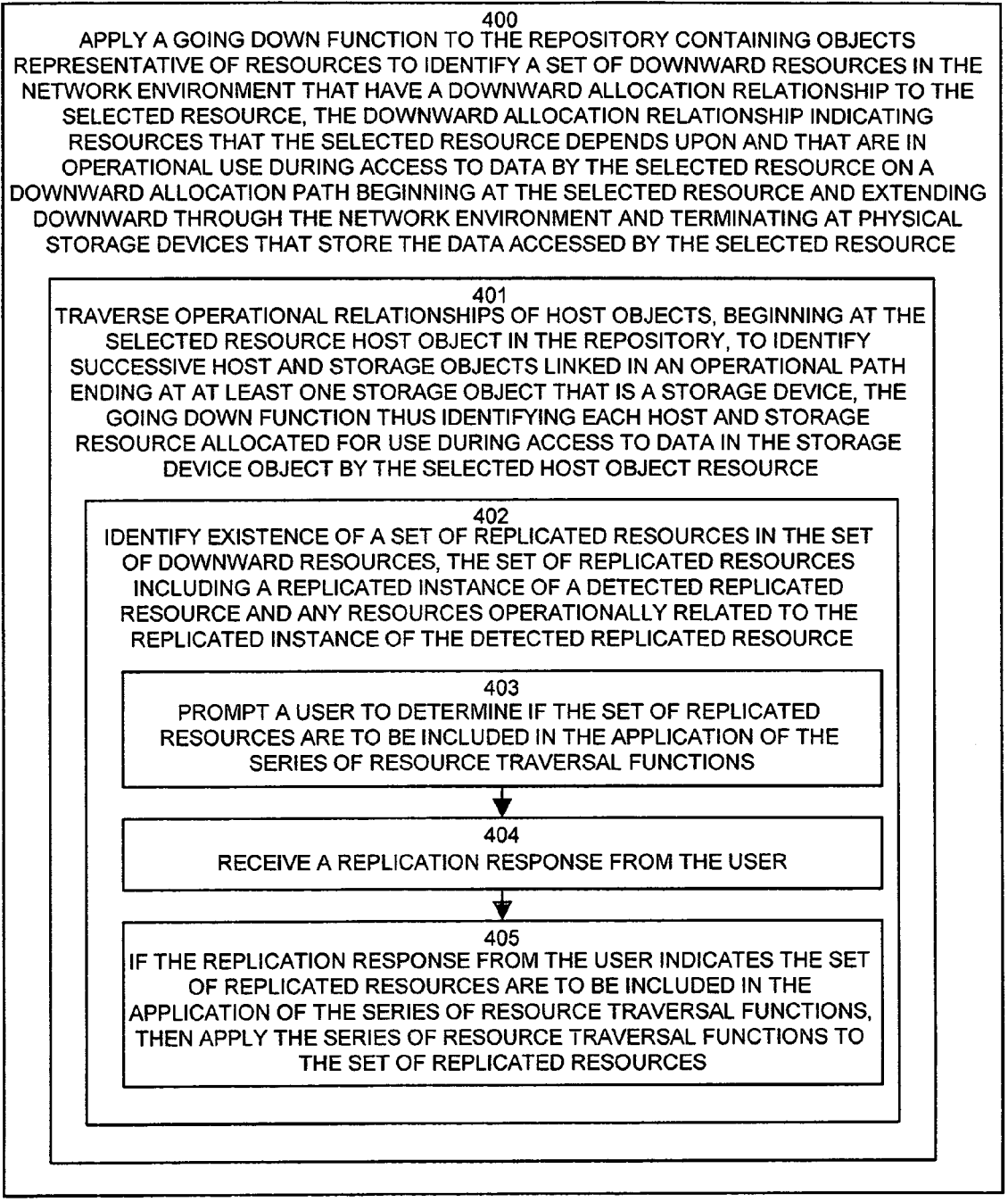
FIG. 4 is a flowchart of processing steps that show processing details of application of a going down resource traversal function in accordance with one embodiment of the invention.

FIG. 4 is a flowchart of processing steps that illustrates details of processing related to application of the going down function as briefly explained above with respect to step 203 in FIG. 3. During the explanation of the going down function, reference will be made to FIG. 5 that illustrates an example of application of the going down function for selected logical volume resource 304-4 shown in FIG. 5 with a highlighted background. In other words, in step 200 FIG. 3 above, the user has selected logical volume 304-4 for application of the management action such as deallocation of storage space from this logical volume.

In step 400, the resource manager 120 applies a going down function as explained with respect to step 203 above. Details of application of the going down function are explained in sub-steps 401 through 405.

In step 401, the resource manager traverses operational relationships (i.e., relationship indicators 310 in FIG. 2) of host objects (i.e., host resources 301 through 306), beginning at the selected resource host object (logical volume resource 304-4) in the repository 125, to identify successive host and storage objects 127 (i.e., resources 305 through 307 below the selected resource 304-4) linked in an operational path 310 ending at least one storage object 307 that is a storage device. The going down function thus identifies each host and storage resource allocated for use during access to data in the storage device object by the selected host object resource 304-4. It is assumed for this discussion that the user has initially selected a host resource 301 through 306. If the user does not initially select a host resource, but instead for example selects a storage resource 307 for application of a management action such as deallocation, no going down function is required.

Figure 5:
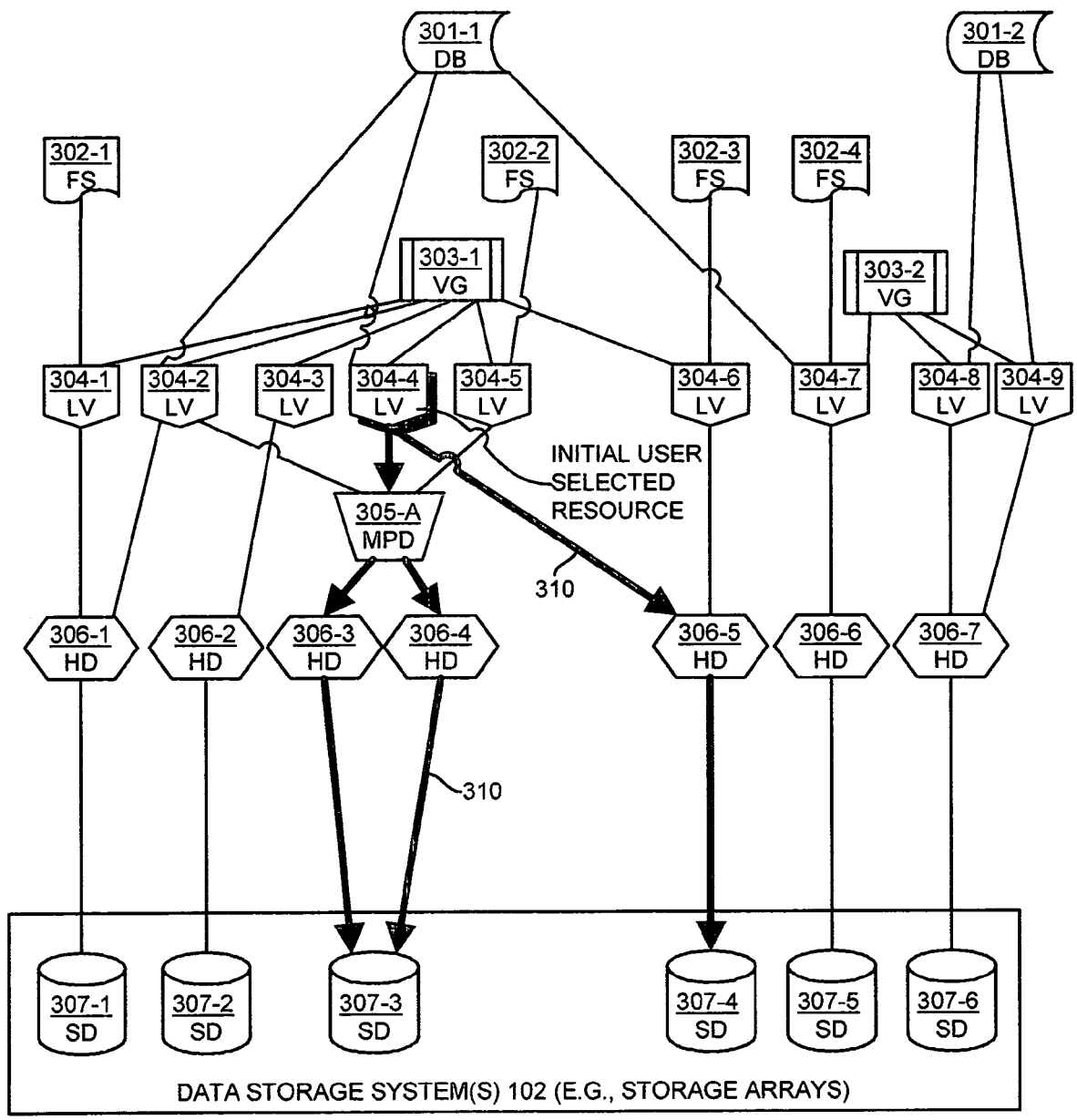
FIG. 5 is a resource relationship diagram illustrating application of a going down function to an example set of resources configured within a host computer system and a data storage system.

As illustrated in FIG. 5, the relationship indicators (some examples of which are labeled 310) having arrowheads extending downward beginning at the logical volume resource 304-4 and ending at the two storage device resources 307-3 and 307-4 indicate (i.e., point to) resources identified along the relationship path of each relationship indicators 310 containing the arrowhead. Sub-steps 402 through 405 provide further details of contingent processing operations of the going down function provided according to example embodiments of the invention to handle situations involving replicated resources. A replicated resource is a resource such as a logical volume that is replicated for redundancy purposes and is provided special processing in this embodiment.

In step 402, the resource manager 120 identifies existence of a set of replicated resources in the set of downward resources. The set of replicated resources includes a replicated instance of a detected replicated resource and any resources operationally related to the replicated instance of the detected replicated resource. In other words, in step 402 the resource manager identifies a resource encountered during application of the going down function that is has a replicated resource counterpart.

In step 403, in response to identifying existence of the replicated resource, the resource manager 120 prompts a user to determine if the set of replicated resources are to be included in the application of the series of resource traversal functions. At this point, the user has the option to include the replicated resource as well as any resources hierarchically related below the replicated copy of the resource within the going down function processing. One purpose of this processing is that if a management action is applied to a resource that is replicated, the management application 119 will also apply the management application to the replicated instance of a resource or, alternatively, the replicated instance of the resource will in some manner be affected by application of the management application to the first instance of the resource. As such, since application of the management action is likely to affect the replicated instance of the resource, the processing steps 402 through 405 provide the user the chance to include the replicated resource and any of its child resources within the going down resource traversal function.

In step 404, the resource manager 120 receives a replication response from the user 108 indicating whether or not the user desires to include the replicated instance of the resource in the going down function processing.

In step 405, if the replication response from the user 108 indicates the set of replicated resources are to be included in the application of the series of resource traversal functions, then the resource manager 120 applies the series of resource traversal functions to the set of replicated resources as well as to the series of discover resources normally perform an as explained. Accordingly, this embodiment of the invention of further enhances the user's knowledge prior to application of a management action by including information regarding replicated resources that may be affected by application of the management action.

Referring briefly now to FIG. 5, based on the explanation above of the going down function, the resource manager 120 has identified a multipath device resource 305-1, the host device resources 306-3 through 306-5 and storage device resources 307-3 and 307-4 as storage area network resources that may be affected by the management action if it were to be applied to the selected resource 304-4. The heavy lines with arrowheads in FIG. 5 extending downward through the set of resources beginning at the logical volume resource 304-4 indicate the traversal relationship paths followed during application of the going down function to arrive at the lowest level storage device resources 307-3 and 307-4.

After application of the going down function in step 203 (FIGS. 3, 4 and 5 as explained above), processing proceeds to step 204 (in FIG. 3) for application of the going up function. Processing details of the going up function will now be explained with respect to the flowchart of processing steps shown in FIG. 6.

Figure 6:
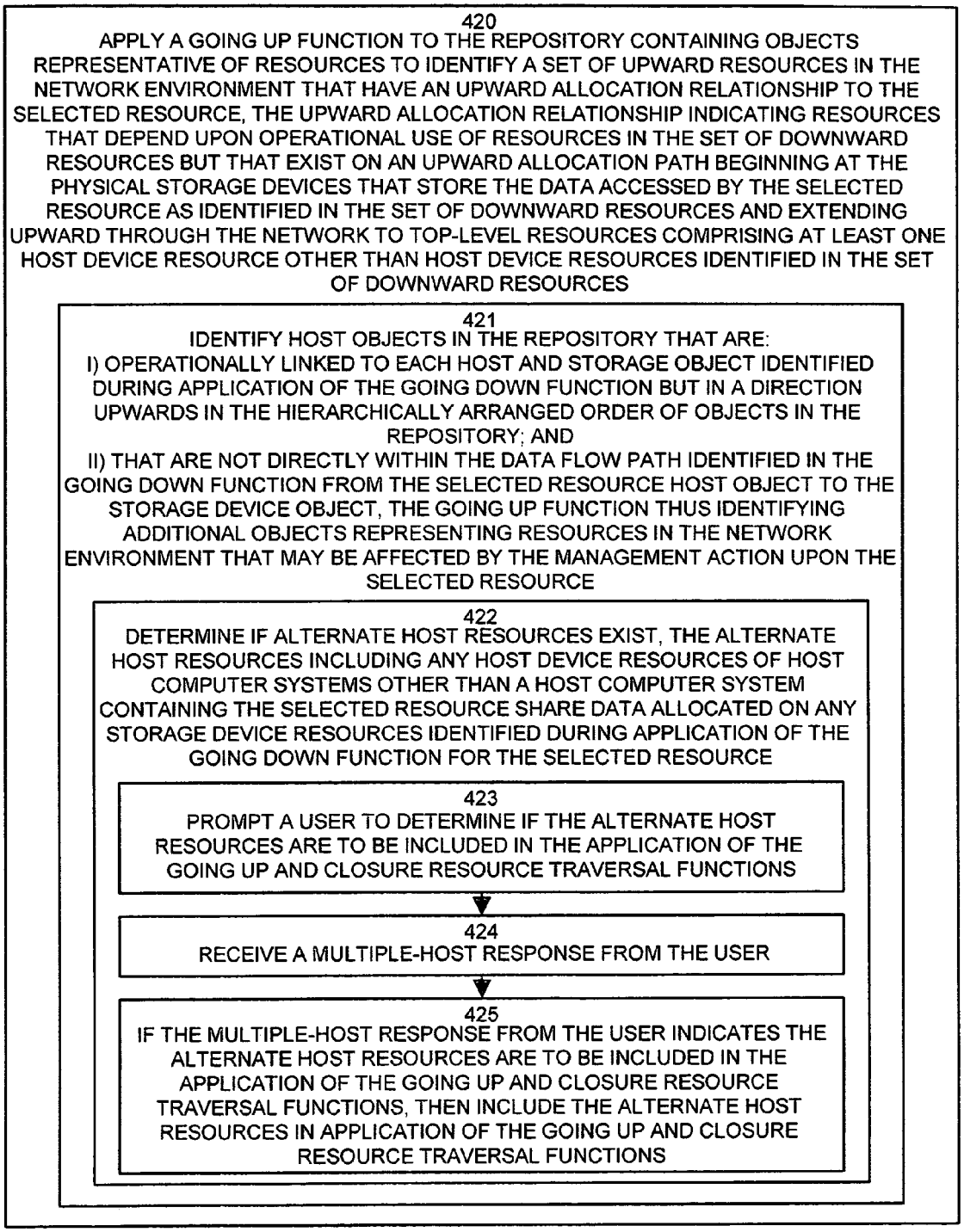
FIG. 6 is a flowchart of processing steps that show processing details of application of a going down resource traversal function in accordance with one embodiment of the invention.

FIG. 6 is a flowchart of processing steps performed by the resource manager 120 for application of the going up function as briefly explained above with respect to step 204 in FIG. 3. In a manner similar to that of the going down function explained above, FIG. 7 is a resource diagram indicating traversal relationship paths that indicate resources identified during application of the going up function as explained with respect to the processing steps of FIG. 6 and will be referred to during this discussion.

In step 420 in FIG. 6, the resource manager 120 applies a going up function as explained above in step 204 FIG. 3. Processing details of the going up function are explained with respect to sub-steps 421 through 425 below.

In step 421, the resource manager 120 identifies host objects 127 (i.e., resources 301 through 306 in FIG. 3) in the repository 125 that are i) operationally linked to each host and storage object 127 identified during application of the going down function but in a direction upwards in the hierarchically arranged order of objects in the repository; and ii) that are not directly within the data flow paths identified in the going down function (FIG. 5) from the selected resource host object (i.e., the logical volume 304-4) to the storage device objects 307-3 and 307-4. The going up function thus identifies additional objects representing resources in the network environment that may be affected by the management action upon the selected resource 304-4 but starting from the storage resources 307-3 and 307-4.

Figure 7:
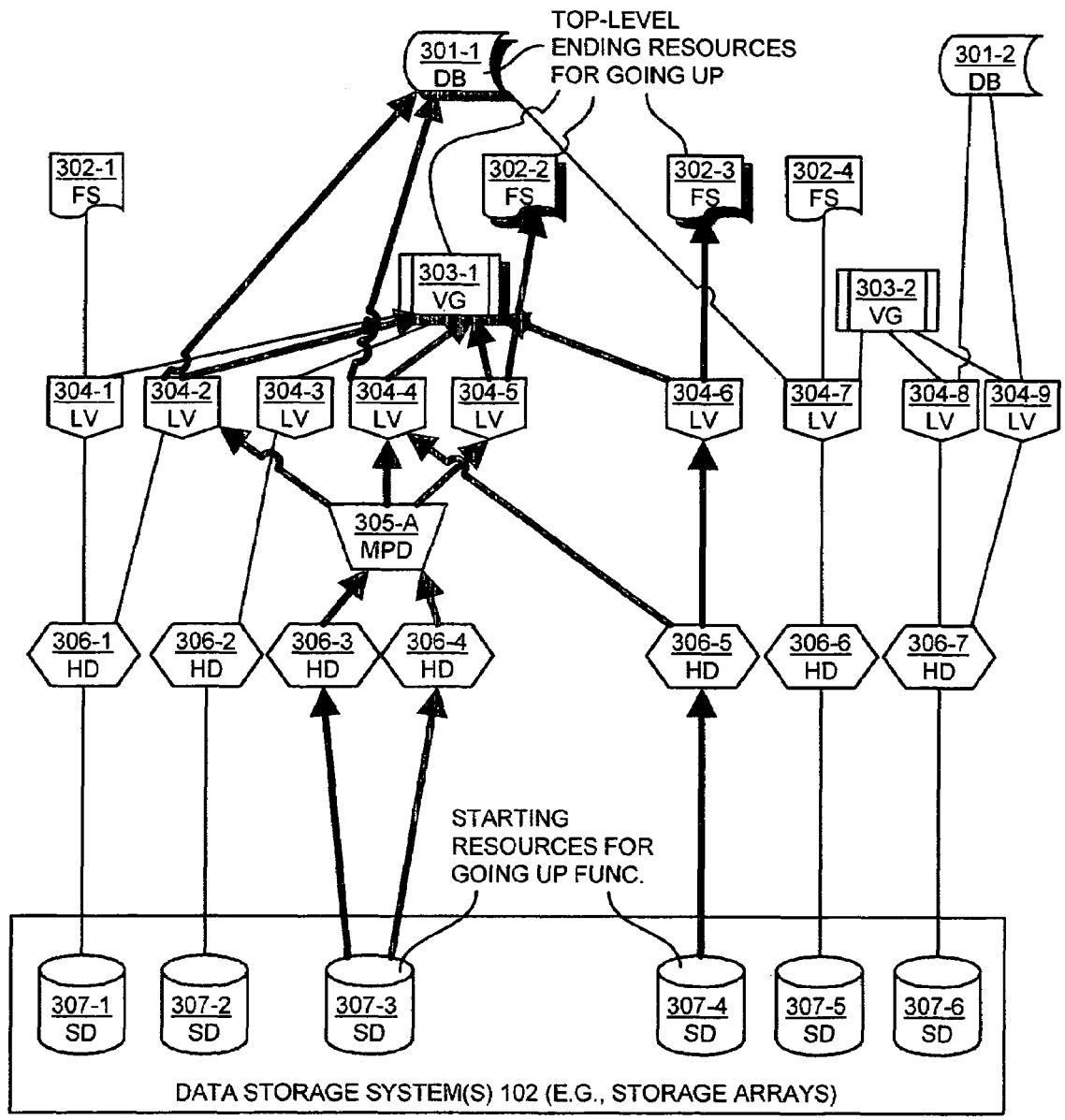
FIG. 7 is a resource relationship diagram illustrating application of a going up function to an example set of resources configured within a host computer system and data storage system.

In other words, directing attention to FIG. 7, in step 421 the resource manager 121 begins at the lowest level or starting storage device resources 307-3 and 307-4 identified from application of the going down function in step 203 and begins navigating resource indicator paths 310 upwards in the resource hierarchy along the lines indicated by arrowheads extending upward. At each newly discovered resource, any upwardly extending resource indicator paths 310 that may branch out from a newly discovered resource are followed until top-level objects such as databases 301, file systems 302 or volume groups 303 are reached. All resources encountered during this processing (and that were not already encountered in the going down function) are added to the collective set of resources that may be affected by application of the management action.

The network environment 100 may include multiple host computer systems 104. As such, there is a chance that multiple host resources in different hosts 104 access a resource such as a storage device object 307 within the data storage system 102 (i.e., from different host computer systems 104). In such situations, sub-steps 422 through 425 provide for this contingency and allow the user to determine whether or not he or she desires to have the going up resource traversal function include resources discoverable within another host computer system(s) 104-2 through 104-P (FIG. 1) that also reference, for example, a storage device resource 307 discovered during application of the going down function in a first host computer system 104-1.

In step 422, the resource manager 120 determines if alternate host resources exist. The alternate host resources include any host device resources of host computer systems 104-2 through 104-P other than a host computer system 104-1 containing the selected resource 304-4 and that share data allocated on any storage device resources 307 identified during application of the going down function for the selected resource 304-4. If alternate host resources exist, the resource manager performs the processing steps 423 through 425.

In step 423, the resource manager 120 prompts the user 108 to determine if the alternate host resources are to be included in the application of the going up and closure (to be explained) resource traversal functions. This prompt can be presented on a graphical user interface within the display 130 of the management computer system 110.

In step 424, the resource manager 120 receives a multiple-host response from the user 108 indicating whether or not the user desires to include resources from another host computer system that references a resource discovered during the going down function.

In step 425, if the multiple-host response from the user 108 indicates the alternate host resources are to be included in the application of the going up and closure resource traversal functions, then the resource manager 120 includes the alternate host resources in application of the going up and closure resource traversal functions.

Referring briefly now to FIG. 7, based on the explanation above of the going up function, the resource manager 120 has identified additional top-level ending resources including logical volumes 304-2 and 304-6, database 301-1 and file systems 302-2 and 302-3 as being additional resources that may be affected by the management action if it were to be applied to the selected resource 304-4. These additional resources were not previously discovered during application of the going down function as illustrated the example in FIG. 5. Again, the heavy lines with arrowheads in FIG. 7 extending upward through the set of resources beginning at storage device resources 307-3 and 307-4 indicate the traversal of relationship paths followed during application of the going up function to arrive at the newly discovered top level resources 301-1, 302-2, 302-3 and 303-1 each indicated by background shading. These top-level resources 301-1, 302-2, 302-3 and 303-1, as well as any other resources along the paths in FIG. 7 may be impacted by the management action if applied to the logical volume 304-4. The resource manager 120 adds all resources discovered during application of the going up function to the set of action-affected resources.

After application of the going up function in step 204 as explained above, processing proceeds to step 205 for application of the closure function. Processing details of the closure function will now be explained with respect to the flowchart of processing steps shown in FIG. 8.

FIG. 8 is a flowchart of processing steps performed by the resource manager 120 for application of the closure function as briefly explained above with respect to step 205 in FIG. 3. In a manner similar to that of the going down and going up functions explained above, FIG. 9 is a resource diagram indicating traversal paths and resources identified during application of the closure function as explained with respect to the processing steps of FIG. 8 and will be referred to during the discussion of processing in FIG. 8.

In step 440 in FIG. 8, the resource manager 120 applies a closure function to the repository containing objects as explained above with respect to step 205 in FIG. 3. Processing step 441 indicates details of application of the closure function according to one example embodiment of the invention.

In step 441, to apply the closure function, the resource manager 120 identifies closure objects in the repository by recursively re-applying an operation of the going up and going down functions to all the additional newly discovered objects (i.e., representing resources) representing resources in the network environment that may be affected by the management action upon the selected resource that were identified during operation of the going up function. In other words, the closure application in this example embodiment of the invention is a re-application of the going down and going up processing of FIGS. 4 and 6 but that is performed upon each of the resources discovered during application of the going up function explained above. Any newly discovered objects found by going down and going up from closure are again processed. This continues repeatedly until no new objects are discovered. The result of closure is a collection of additional objects that could be affected by applying a management action to any of the original objects.

Figure 9:
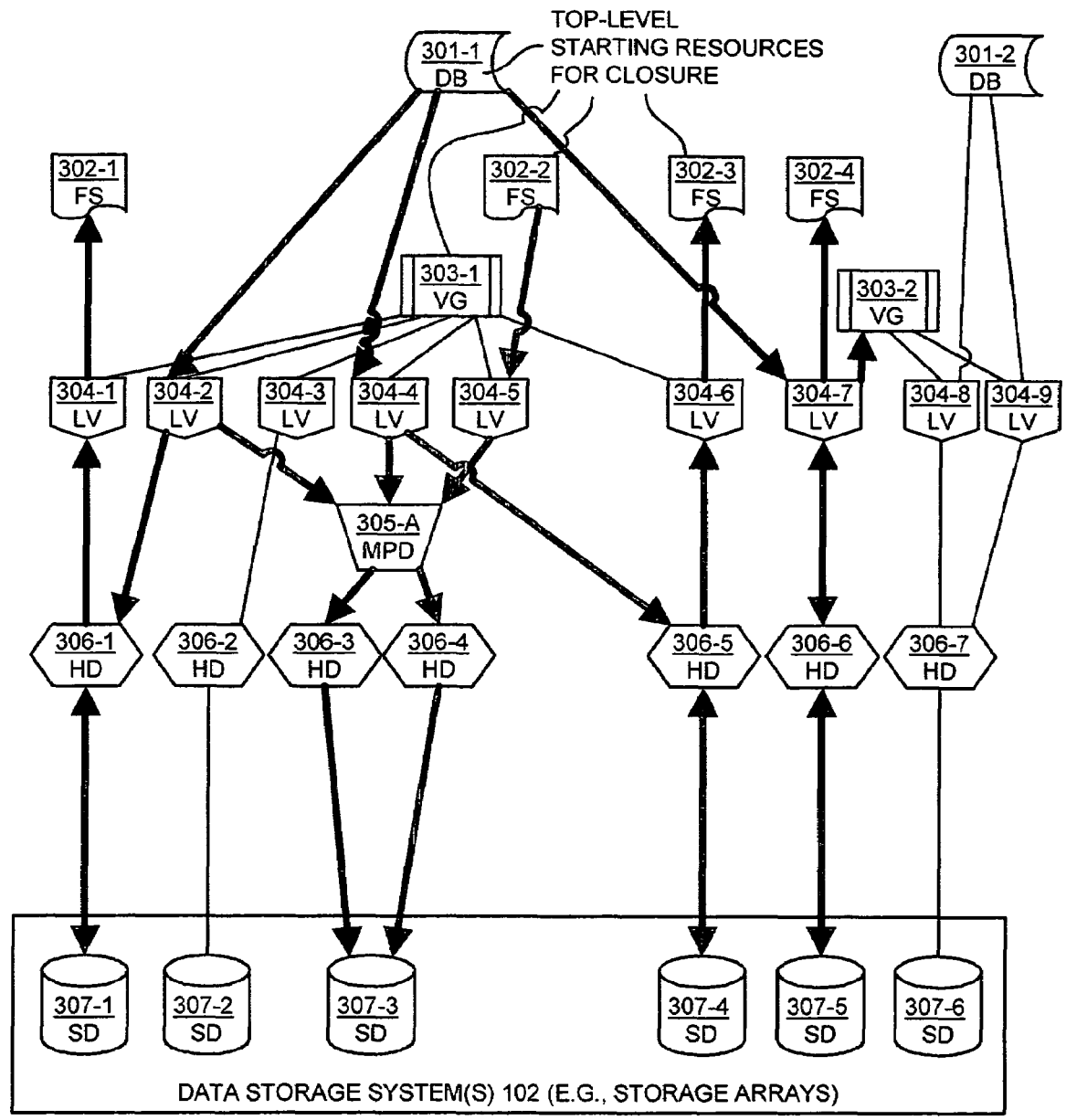
FIG. 9 is a resource relationship diagram illustrating application of a closure resource traversal function to an example set of resources configured within a host computer system and data storage system.
Figure 10:
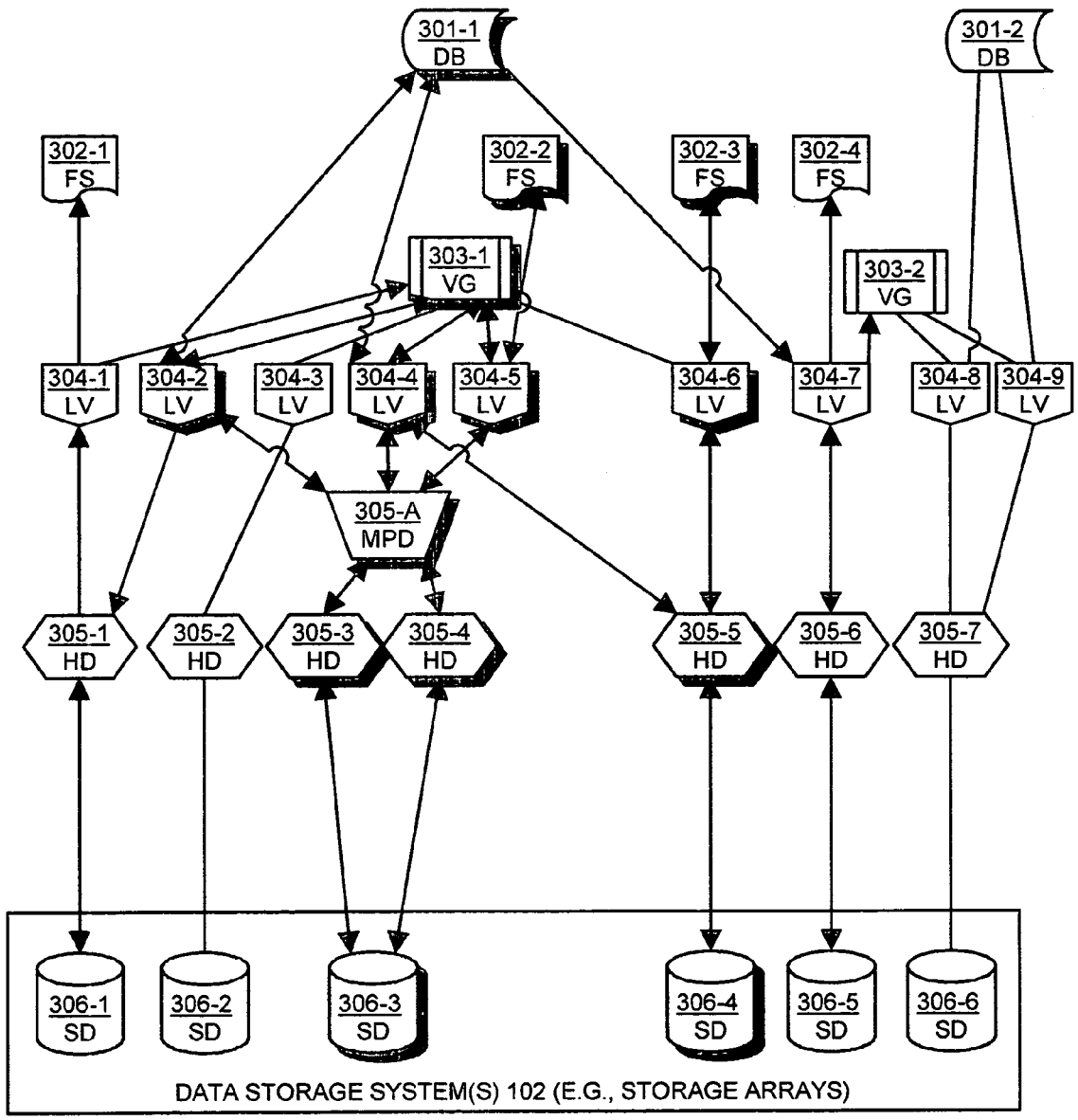
FIG. 10 is a resource relationship diagram illustrating a collective set of action-affected resources discovered during application of the going down function, the going up function in a closure function in accordance with one example embodiments of the invention.

In one embodiment, the going down and going up functions performed during closure differ from the initial going down and going up functions in that they ignore as a starting point, for the going down function in closure, any Volume Groups or any similar objects that represent groups of resources, rather than being resources themselves. This is illustrated in FIGS. 9 and 10 since during application of an iteration of the going down function in closure, the Volume group 303-1 is not used as a starting point, even though it is discovered during application of the going up function. Accordingly, volume 304-3 and host device 305-2 and storage device 306-2 are not discovered since the relationships of these the originate from the volume group 303-1.

Figure 11:
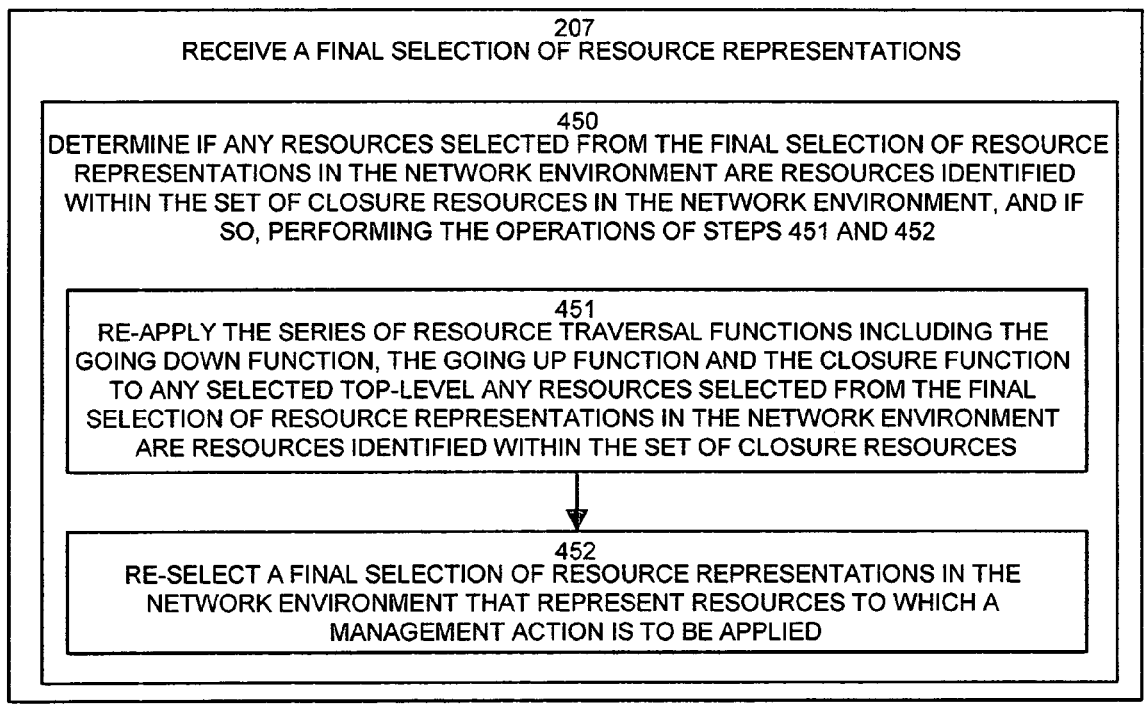
FIG. 11 is a flowchart of processing steps that show processing details of final selection of resources by a user in accordance with one embodiment of the invention.

FIG. 10 illustrates the collective set of action-affected resources after application of the going down function, the going up function and the closure function in accordance with embodiment of the invention. As illustrated in FIG. 11, resources having a line with at least one arrowhead pointing to that resource are considered a member of the set of collective action-affected resources. Resources with a shaded or highlighted background indicate those resources identified from application of the going down and going up functions that are automatically added to the set of resources to which the management action will be applied. In other words, resources discovered during the going down and going up functions are pre-selected for the user and if the user applies the management action, these resources will be included. However, the non-shaded resources that include an arrowhead pointing to them are those resources discovered during the closure function and are not automatically added to the resource set to which that action will be applied, but are nonetheless included in the set of action-affected resources (i.e., those resources that may be affected by the management action). This information of action-affected resources is presented to the user 108 of the management application 119 step 206 of the processing shown in FIG. 3.

FIG. 11 is a flowchart of processing steps that illustrates details of processing to receiving a final selection of resource representations in step 207 of FIG. 3 as briefly explained above.

In step 207 as explained above, the resource manager 120 receives a final selection of resource representations in the network environment that represent resources to which a management action is to be applied. The final selection is made from the collective set of action-affected resources that relate to operation of the selected resource, such as the set of background and/or non-background shaded resources illustrated FIG. 10. At this point processing, the resource manager 120 presents a user 108 with the list of resources with a highlighted and/or non-highlighted background as illustrated in FIG. 10. The resources can be presented as illustrated in FIG. 10 (e.g., as a graphical depiction of the host and storage resources, or in another form such as in a table or list. The resource manager 120 automatically pre-selects those background shaded resources (from the going down and going up functions) for application of the management action on behalf of the user. However, the set of closure-only resources indicate resources that were not previously discovered by the going down or going up functions, and thus do not have a highlight background (but are included in the set of action-affected or discovered resources since they do have arrowheads extending towards them).

Depending upon the implementation, the different resources identified in the collective set of action-affected resources in FIG. 11 can be color-coordinated to indicate which resource traversal function identified those resources exclusively. As an example, all resources identified only by the closure function can be indicated as having a pink or other unique-colored background or shading or no shading (as in the example in FIG. 10) in order to convey to the user that those resources are the closure resources and are not currently included in the set of resources to which the action will be applied.

In addition, as shown in FIG. 10, the closure resources can be indicated as being unselected for application of the management command whereas the other resources discovered in accordance with the going down and going up functions can be indicated as being selected (i.e., shaded) for application of the management command. In other words, even though the user selected the volume group 304-4 in the aforementioned example for application of the management command such as deallocation of storage space associated with the volume group 304-4, the other resources discovered during the initial going down and going up functions (as opposed to those function being used during closure) can be displayed as being selected and shaded for application of this deallocation management action. However, in accordance with this example embodiment of the invention, those resources discovered as a result of the closure function application are indicated as possibly being affected by application of the deallocation management command via arrowheads but are also shown in FIG. 10 as not currently selected (i.e., not shaded) for application of the management action.

At this point, the user 108 has the option of selecting or unselecting resources for addition or removal from the collective set of action-affected resources to which the management action will be applied. In other words, in step 207, the user is able to add or remove resources in the final set of resources to which the management action will be applied. Details of processing step 207 are shown in sub-steps 450 to 452.

In step 450, the resource manager 120 determines if any resources selected from the final selection of resource representations in the network environment are resources identified within the set of closure resources in the network environment. As noted above, if the user decides to include closure resources for application of the management command to the selected resource 304-4, the user may select any initially unselected closure resources to which the management action is to be applied (as noted above, the closure resources are initially unselected). If the user decides to include closure resources in the set of resources to which the management action will be applied, processing proceeds to perform steps 451 and 452. As an example from FIG. 10, if the user selects one of the set of closure-only resources (these resources were not previously discovered by the going down or going up functions, they were only discovered by the closure function), the processing of steps 451 and 452 is performed.

In step 451, the resource manager 120 re-applies the series of resource traversal functions including the going down function, the going up function and the closure function to any selected closure resources selected from the final selection of resource representations in the network environment.

In step 452, the resource manager 120 re-selects a final selection of resource representations in the network environment that represent resources to which a management action is to be applied. In other words, in step 452, after reapplication of the resource traversal functions to the selected top-level closure resources, the user is again presented with the opportunity to reselect more or less resources to which the management action is to be applied. Again, if the user selects additional closure-only identified resources identified during the second application of the closure function, processing can again returned to step 451. This process can be repeated until either the user selects no closure-only identified resources or until all resources have been identified to which any closure resources relate.

In an alternative embodiment, all resources on a single host computer system that are discovered during application of the going down, going up and closure function processing are included in the set of resources to which the management action is applied. However, application of the resource traversal functions may end up discovering a storage device that is shared between resources of two host computer system. In such cases, any resources that are discovered on the other host computer systems (after prompting the user as explained above) are not included as shaded for application of the management command.

Upon completion of the processing in FIG. 11, embodiments of the invention apply the management function to the selected resources as explained in step 208 of FIG. 3. In this manner, embodiments of the invention provide management applications that apply management functionality, actions or commands to particular resources with a network with the ability to discover related resources in a hierarchical arrangement of resources and allow the user to remain fully informed about resource dependencies within a complex network environment 100. Accordingly, resources that may experience a negative effect from application of a management command to another resource may be discovered and identified prior to actual application of the management command. This provides a significant advantage over conventional management applications since embodiments of the invention determine, prior to application of the management action, what the ramifications of the action might be upon other resources with the network environment thus preventing accidental damage, disturbance or disrupts to those other resources.

Figure 12:
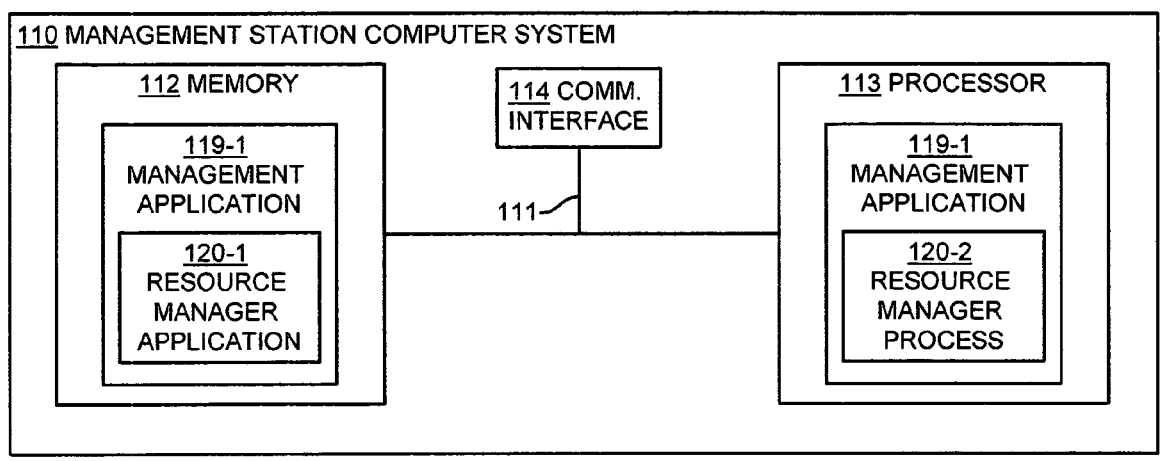
FIG. 12 is an example architecture of a management station computer system configured with a management application and resource manager in accordance with one example embodiment of the invention.

FIG. 12 illustrates an example architecture of a management computer system 110 in accordance with embodiments of the invention. The management computer system 110 may be any type of computerized system such as a personal computer, workstation, portable computing device, host, mainframe, server and/or the like. In this example, the computer system 110 includes an interconnection mechanism 111 that couples a memory system 112, a processor 113, and a communications interface 114. The communications interface 114 allows the computer system 110 to communicate with the storage area network 100 and for display of resource information as explained herein (e.g. as shown in FIGS. 2 and 10). Alternatively, a display 130 may be included as attached to the computer system 110 for display of resource information as explained herein.

The memory system 112 may be any type of computer readable medium that is encoded with a management application 119-1 and resource manager application 120-1 that each represent software code such as data and/or logic instructions (e.g., stored in the memory or on another computer readable medium such as a disk) that embody the processing functionality of embodiments of the invention as explained above. The processor 113 can access the memory system 112 via the interconnection mechanism 111 in order to launch, run, execute, interpret or otherwise perform the logic instructions of the applications 119-1 and 120-1 in order to produce a corresponding management and resource manager processes 119-2 and 120-2. In other words, the processes 119-2 and 120-2 represent one or more portions of the applications 119-1 and 120-1 performing (e.g., executing) within or upon the processor 113 in the computer system 110. It is to be understood that the resource manager 120 operating as explained in former embodiments is represented in FIG. 12 by any combination of the applications 119-1 and 120-1 and/or the processes 119-2 and 120-2.

Is to be understood that embodiments of the invention include the applications 119-1 and 120-1 (i.e., the un-executed or non-performing logic instructions and/or data) encoded within a fixed or removable computer readable medium such as a floppy disk, hard disk or in an optical medium, or in a memory system such as in firmware, read only memory (ROM), or, as in this example, as executable code within the memory system 112 (e.g., within random access memory or RAM). It is also to be understood that other embodiments of the invention provide the applications 119-1 and 120-1 operating within the processor 113 as processes 119-2 and 120-2. While not shown in this example, those skilled in the art will understand that the computer system 110 may include other processes and/or software and hardware components, such as an operating system, which have been left out of this illustration for ease of description of the invention. Thus embodiments of the invention include a management application configured with a resource manager program existing as either code in unexecuted form on a computer readable medium (e.g., as a software program on a transportable medium such as a CDROM) or as an executing software process or as a computer system configured to operate as explained herein.

Alternative arrangements of the invention include rearranging the processing steps explained above in the flow charts in such a way that the overall effect of the invention is the same. It is to be thus understood by those skilled in the art that the particular arrangement of processing steps in many instances does not specify implementation of embodiments of the invention. As such, those skilled in the art of software development and computer-related technologies will understand that there can be many ways and orders of representing the processing operations explained above and such alternative embodiments of the software code will still achieve the overall effects, features and advantages of the invention as explained herein. In addition, embodiments of the invention are not limited to operation on the computer systems shown above or in a storage area network environment. The system of the invention can operate on shared computing resources, or can be distributed among any number of computer systems and can be embodied in any type of management application. Accordingly, embodiments of the invention are not limited to operation in a storage area network management application, but are intended to be generally applicable to any type of application for which resources depend upon one another. Accordingly, embodiments of the invention are not limited to the processing arrangements explained above.

What is claimed is:

1. In a management application, a method for applying a management action to a resource, the method comprising:

receiving a selection of a resource representation in a network environment that represents a resource to which a management action is to be applied;

applying a series of resource traversal functions to a repository containing objects representative of network resources in the network environment, the traversal functions identifying a set of action affected resources in the network environment existing along a set of relationship paths extending to at least one storage device that have a current allocation relationship to the selected resource, by:

applying a going down function to the repository containing objects representative of resources to identify a set of downward resources in the network environment that have a downward allocation relationship to the selected resource, the downward allocation relationship indicating resources that the selected resource depends upon and that are in operational use during access to data by the selected resource on a downward allocation path beginning at the selected resource and extending downward through the network environment and terminating at physical storage devices that store the data accessed by the selected resource, by:

identifying existence of a set of replicated resources in the set of downward resources, the set of replicated resources including a replicated instance of a detected replicated resource and any resources operationally related to the replicated instance of the detected replicated resource; and presenting a representation of the set of action affected resources in the network environment to a user of the management application, the representation of the set of action affected resources informing the user of resources within the storage area network that are currently in an functional relationship with the selected resource to which a management action is to be applied and that may be affected if the management action is to be applied to the selected resource.

2. The method of claim 1 wherein applying the going down function comprises:

in response to identifying existence of the replicated resource:

prompting a user to determine if the set of replicated resources are to be included in the application of the series of resource traversal functions;

receiving a replication response from the user;

if the replication response from the user indicates the set of replicated resources are to be included in the application of the series of resource traversal functions, then applying the series of resource traversal functions to the set of replicated resources.

3. The method of claim 1 wherein applying a series of resource traversal functions comprises:

applying a going up function to the repository containing objects representative of resources to identify a set of upward resources in the network environment that have an upward allocation relationship to the selected resource, the upward allocation relationship indicating resources that depend upon operational use of resources in the set of downward resources but that exist on an upward allocation path beginning at the physical storage devices that store the data accessed by the selected resource as identified in the set of downward resources and extending upward through the network to top-level resources comprising at least one host device resource other than host device resources identified in the set of downward resources.

4. The method of claim 3 wherein applying a going up function comprises:

determining if alternate host resources exist, the alternate host resources including any host device resources of host computer systems other than a host computer system containing the selected resource share data allocated on any storage device resources identified during application of the going down function for the selected resource, and if alternate host resources exist:

prompting a user to determine if the alternate host resources are to be included in the application of the going up and closure resource traversal functions;

receiving a multiple-host response from the user;

if the multiple-host response from the user indicates the alternate host resources are to be included in the application of the going up and closure resource traversal functions, then including the alternate host resources in application of the going up and closure resource traversal functions.

5. The method of claim 3 wherein applying a series of resource traversal functions comprises:

applying a closure function to the repository containing objects representative of resources to identify a set of closure resources in the network environment that have an indirect relationship to any resources in the set of upward and downward resources, the set of closure resources indicating resources that would be affected by a change made to operation of resources.

6. The method of claim 5 wherein applying a series of resource traversal functions including the going down function, the going up function and the closure function comprises:

identifying a collective set of action-affected resources that relate to operation of the selected resource and include the set of downward resources, the set of upward resources and the set of closure resources on data flow paths within the network environment.

7. The method of claim 6 comprising:

receiving a final selection of resource representations in the network environment that represent resources to which a management action is to be applied, the final selection being made from the collective set of action-affected resources that relate to operation of the selected resource; and applying the management action to the final selection of resource representations.

8. The method of claim 7 wherein receiving a final selection of resource representations comprises:

determining if any resources selected from the final selection of resource representations in the network environment are resources identified within the set of closure resources in the network environment, and if so, performing the operations of:

re-applying the series of resource traversal functions including the going down function, the going up function and the closure function to any selected top-level any resources selected from the final selection of resource representations in the network environment are resources identified within the set of closure resources; and re-selecting a final selection of resource representations in the network environment that represent resources to which a management action is to be applied.

9. The method of claim 7 wherein the management application is a storage management application and the management action is deallocation of resources that operate to store data under management of the management application.

10. The method of claim 9 wherein:
objects representative of resources in the network environment in the repository are hierarchically arranged in an order and include host objects representing host resources and storage objects representing storage resources in allocated by the host resources and where the host objects are hierarchically above the storage objects in the hierarchically arranged order; and
wherein the selected resource representation corresponds to a host object resources; and
wherein applying the going down function comprises:
traversing operational relationships of host objects, beginning at the selected resource host object in the repository, to identify successive host and storage objects linked in an operational path ending at least one storage object that is a storage device, the going down function thus identifying each host and storage resource allocated for use during access to data in the storage device object by the selected host object resource.

11. The method of claim 10 wherein applying the going up function comprises:
identifying host objects in the repository that are:
i) operationally linked to each host and storage object identified during application of the going down function but in a direction upwards in the hierarchically arranged order of objects in the repository; and
ii) not directly within the data flow path identified in the going down function from the selected resource host object to the storage device object, the going up function thus identifying additional objects representing resources in the network environment that may be affected by the management action upon the selected resource.

12. The method of claim 11 wherein applying the closure function comprises:
identifying closure objects in the repository by repeatedly re-applying an operation of the going down function and going up function to the additional objects representing resources in the network environment that may be affected by the management action upon the selected resource that were identified during operation of the going up function.

13. The method of claim 12 wherein hierarchically arranged host objects include a top-level host computer system, a database, a file system, a volume group, a logical volume, a multipath device, a host interface device, a host port; and
wherein hierarchically arranged storage objects include a lowest-level storage device, a storage adapter, and a storage port.

14. The method of claim 1 wherein applying comprises:
applying a series of resource traversal functions to a repository containing objects representative of network resources in the network environment, the objects arranged in a resource hierarchy representative of the actual hierarchy of the network resources in the network environment, wherein a connection between two resources in the resource hierarchy is a relationship indicator path, the resource traversal functions navigating up and down the hierarchy along relationship indicator paths to identify a set of action affected resources, the action affected resources including resources connected to the selected resource along one or more relationship indicator paths.

15. The method of claim 1 wherein presenting comprises:
presenting a representation of the set of action affected resources in the network environment to a user of the management application independent of a location of an action affected resource in a level of a hierarchy of the resources, the representation informing the user of those resources in the storage area network related to the selected resource and that may be affected if the user chooses to apply the management action to the selected resource.

16. The method of claim 1 wherein applying comprises:
applying a series of resource traversal functions to a repository containing objects representative of network resources in the network environment, the traversal functions identifying a set of action affected resources in the network environment existing along a set of relationship paths extending to at least one storage device that have a current allocation relationship to the selected resource, the set of action affected resources identified without applying a management action to the selected resource; and wherein presenting comprises:
presenting a representation of the set of action affected resources in the network environment to a user of the management application, the representation of the set of action affected resources informing the user of resources within the storage area network that are currently in an functional relationship with the selected resource to and that may be affected when the management action is applied to the selected resource.

17. The method of claim 1 comprising:
prior to applying a series of resource traversal functions:
receiving a management action to be applied to the selected resource; and
delaying application of the received action to the selected resource until a delay condition is satisfied.

18. The method of claim 17 comprising:
receiving a final selection of a resource representation in the network environment, the final selection comprising at least one of the presented action affected resources, the receipt of the final selection of the resource representation and the presentation of the representation of the set of action affected resources satisfying the delay condition; and
applying the received management action to the final selection of the resource representation.

19. The method of claim 18 wherein receiving a final selection comprises:
automatically adding an action affected resource identified by the resource traversal functions to a final selection of resource representations in the network environment, the receipt of the final selection of resource representations and the presentation of the representation of the set of action affected resources satisfying the delay condition.

20. A computer system comprising:
a memory;
a processor;
a display;
a repository;
an interconnection mechanism coupling the memory, the processor, the display and the repository; and
wherein the memory is encoded with a management application including a resource manager application that, when executed on the processor, provides a management process that includes a resource manager that applies a management action to a resource by performing, in the computer system, the operations of:

receiving, via a graphical user interface on the display, a selection of a resource representation in a network environment that represents a resource to which a management action is to be applied;

applying a series of resource traversal functions to the repository containing objects representative of network resources in the network environment, the traversal functions identifying a set of action affected resources in the network environment existing along a set of relationship paths extending to at least one storage device that have a current allocation relationship to the selected resource, by:

applying a going down function to the repository containing objects representative of resources to identify a set of downward resources in the network environment that have a downward allocation relationship to the selected resource, the downward allocation relationship indicating resources that the selected resource depends upon and that are in operational use during access to data by the selected resource on a downward allocation path beginning at the selected resource and extending downward through the network environment and terminating at physical storage devices that store the data accessed by the selected resource, by:

identifying existence of a set of replicated resources in the set of downward resources, the set of replicated resources including a replicated instance of a detected replicated resource and any resources operationally related to the replicated instance of the detected replicated resource; and presenting a representation of the set of action affected resources in the network environment to a user of the management application, the representation of the set of action affected resources informing the user of resources within the storage area network that are currently in an functional relationship with the selected resource to which a management action is to be applied and that may be affected if the management action is to be applied to the selected resource.

21. The computer system of claim 20 wherein when the resource manager performs the operation of applying the going down function, the resource manager performs the operations of:

in response to identifying existence of the replicated resource:

prompting a user to determine if the set of replicated resources are to be included in the application of the series of resource traversal functions;

receiving a replication response from the user;

if the replication response from the user indicates the set of replicated resources are to be included in the application of the series of resource traversal functions, then applying the series of resource traversal functions to the set of replicated resources.

22. The computer system of claim 20 wherein when the resource manager performs the operation of applying a series of resource traversal functions, the resource manager performs the operation of:

applying a going up function to the repository containing objects representative of resources to identify a set of upward resources in the network environment that have an upward allocation relationship to the selected resource, the upward allocation relationship indicating resources that depend upon operational use of resources in the set of downward resources but that exist on an upward allocation path beginning at the physical storage devices that store the data accessed by the selected resource as identified in the set of downward resources and extending upward through the network to top-level resources comprising at least one host device resource other than host device resources identified in the set of downward resources.

23. The computer system of claim 22 wherein when the resource manager performs the operation of applying a going up function, the resource manager performs the operations of:

determining if alternate host resources exist, the alternate host resources including any host device resources of host computer systems other than a host computer system containing the selected resource share data allocated on any storage device resources identified during application of the going down function for the selected resource, and if alternate host resources exist:

prompting a user to determine if the alternate host resources are to be included in the application of the going up and closure resource traversal functions;

receiving a multiple-host response from the user;

if the multiple-host response from the user indicates the alternate host resources are to be included in the application of the going up and closure resource traversal functions, then including the alternate host resources in application of the going up and closure resource traversal functions.

24. The computer system or claim 22 wherein when the resource manager performs the operation of applying a series of resource traversal function, wherein when the resource manager performs the operation of:

applying a closure function to the repository containing objects representative of resources to identify a set of closure resources in the network environment that have an indirect relationship to any resources identified by going down and going up, the set of closure resources indicating resources that would be affected by a change made to operation of original resources.

25. The computer system of claim 24 wherein when the resource manager performs the operations of applying a series of resource traversal functions including the going down function, the going up function and the closure function, the resource manager performs the operation of:

identifying a collective set of action-affected resources that relate to operation of the selected resource and include the set of downward resources, the set of upward resources and the set of closure resources on data flow paths within the network environment.

26. The computer system of claim 25 wherein the resource manager performs the operations of:

receiving a final selection of resource representations in the network environment that represent resources to which a management action is to be applied, the final selection being made from the collective set of action-affected resources that relate to operation of the selected resource; and applying the management action to the final selection of resource representations.

27. The computer system of claim 26 wherein when the resource manager performs the operation of receiving a final selection of resource representations, the resource manager performs the operations of:

determining if any resources selected from the final selection of resource representations in the network environment are resources identified within the set of closure resources in the network environment, and if so, performing the operations of:

re-applying the series of resource traversal functions including the going down function, the going up function and the closure function to any selected top-level any resources selected from the final selection of resource representations in the network environment are resources identified within the set of closure resources; and re-selecting a final selection of resource representations in the network environment that represent resources to which a management action is to be applied.

28. The computer system of claim 26 wherein the management application is a storage management application and the management action is deallocation of resources that operate to store data under management of the management application.

29. The computer system of claim 28 wherein:

objects representative of resources in the network environment in the repository are hierarchically arranged in an order and include host objects representing host resources and storage objects representing storage resources in allocated by the host resources and where the host objects are hierarchically above the storage objects in the hierarchically arranged order; and wherein the selected resource representation corresponds to a host object resources; and wherein when the resource manager performs the operation of applying the going down function, the resource manager performs the operation of:

traversing operational relationships of host objects, beginning at the selected resource host object in the repository, to identify successive host and storage objects linked in an operational path ending at least one storage object that is a storage device, the going down function thus identifying each host and storage resource allocated for use during access to data in the storage device object by the selected host object resource.

30. The computer system of claim 29 wherein when the resource manager performs the operation of applying the going up function, the resource manager performs the operation of:

identifying host objects in the repository that are:

i) operationally linked to each host and storage object identified during application of the going down function but in a direction upwards in the hierarchically arranged order of objects in the repository; and ii) that are not directly within the data flow path identified in the going down function from the selected resource host object to the storage device object, the going up function thus identifying additional objects representing resources in the network environment that may be affected by the management action upon the selected resource.

31. The computer system of claim 30 wherein when the resource manager performs the operation of applying the closure function, the resource manager performs the operation of:

identifying closure objects in the repository by repeatedly re-applying an operation of the going down function and going up function to the additional objects representing resources in the network environment that may be affected by the management action upon the selected resource that were identified during operation of the going up function.

32. The computer system of claim 31 wherein hierarchically arranged host objects include a top-level host computer system, a database, a file system, a volume group, a logical volume, a multipath device, a host interface device, a host port; and wherein hierarchically arranged storage objects include a lowest-level storage device, a storage adapter, and a storage port.

33. A computer program product having a computer-readable storage medium including computer program logic encoded thereon that, when executed on a computer system provides a method for applying a management action to a resource in a network by causing the computer system to perform the operations of:

receiving a selection of a resource representation in a network environment that represents a resource to which a management action is to be applied;

applying a series of resource traversal functions to a repository containing objects representative of network resources in the network environment, the traversal functions identifying a set of action affected resources in the network environment existing along a set of relationship paths extending to at least one storage device that have a current allocation relationship to the selected resource, by:

applying a going down function to the repository containing objects representative of resources to identify a set of downward resources in the network environment that have a downward allocation relationship to the selected resource, the downward allocation relationship indicating resources that the selected resource depends upon and that are in operational use during access to data by the selected resource on a downward allocation Path beginning at the selected resource and extending downward through the network environment and terminating at physical storage devices that store the data accessed by the selected resource, by:

identifying existence of a set of replicated resources in the set of downward resources, the set of replicated resources including a replicated instance of a detected replicated resource and any resources operationally related to the replicated instance of the detected replicated resource; and presenting a representation of the set of action affected resources in the network environment to a user of the management application, the representation of the set of action affected resources informing the user of resources within the storage area network that are currently in an functional relationship with the selected resource to which a management action is to be applied and that may be affected if the management action is to be applied to the selected resource.

* * * * *